United States Patent [19]

Horike et al.

[11] 4,435,720

[45] Mar. 6, 1984

[54] DEFLECTION CONTROL TYPE INK JET PRINTING APPARATUS

[75] Inventors: Masanori Horike; Yutaka Ebi, both of Tokyo, Japan

[73] Assignee: Ricoh Company, Ltd., Tokyo, Japan

[21] Appl. No.: 378,450

[22] Filed: May 14, 1982

[30] Foreign Application Priority Data

May 21, 1981 [JP] Japan ................................ 56-76926
May 21, 1981 [JP] Japan ................................ 56-76925

[51] Int. Cl.³ ............................................ G01D 15/18
[52] U.S. Cl. ............................................ 346/75
[58] Field of Search .......................... 346/1.1, 75, 140

[56] References Cited

U.S. PATENT DOCUMENTS 3,911,445 10/1975 Foster ................................ 346/1.1
4,328,504 5/1982 Weber et al. .................. 346/140 IJ
4,346,393 8/1982 Wallace et al. ............. 346/140 PD

*Primary Examiner*—Donald A. Griffin
*Attorney, Agent, or Firm*—David G. Alexander

[57] ABSTRACT

A deflection control type ink jet printing apparatus includes a pair of parallel electrodes located downstream of a deflection electrode with respect to an intended direction of ink ejection from an ink ejection head. The electrodes sense a deviation or offset of an actual path of deflection which ink droplets deflected to predetermined one of a plurality of steps follow from a reference path of deflection, which is defined intermediate between the two electrodes. An ink is fed to the head under a pressure which is variable in accordance with the sensed deviation in deflection in order to compensate for the deviation. The two electrodes may be replaced by at least one electrode on which ink droplets deflected to a specific deflection step are to impinge.

9 Claims, 44 Drawing Figures

SHORT
DEFLECTION

PROPER
DEFLECTION

EXCESSIVE
DEFLECTION

| | |
|---|---|
| Fig. 17b-1 | Fig. 17b-2 |
| Fig. 17b-3 | Fig. 17b-4 |

DEFLECTION CONTROL TYPE INK JET PRINTING APPARATUS

BACKGROUND OF THE INVENTION

The present invention relates to a deflection control type ink jet printing apparatus in which a jet of ink under supersonic vibration is ejected from a nozzle to separate into droplets at a predetermined position where a charging electrode is located to selectively charge the ink droplets and the charged ink droplets are deflected by a deflection electrode to impinge on a sheet of paper to reproduce data thereon. More particularly, the present invention is concerned with an ink jet printer of the type which deflects charged ink droplets to a desired deflection by suitably varying the pressure of ink.

It is known in an ink jet printer that deflections of charged ink droplets are affected by various factors such as the pressure and viscosity of ink, the charges on the ink droplets, the intensity of a deflecting electric field and the masses of the ink droplets. For instance, a change in ink temperature is directly reflected by that in ink viscosity and, therefore, in an amount of deflection. Immediately after a power supply to the printer, the ink temperature is low to maintain the flying velocity of ink droplets low. As the ink temperature progressively rises, the ink becomes less viscous to speed up the movement of ink droplets. The relation is hyperbolic in that the deflection decreases as the ink temperature increases. A decrease in deflection can be compensated for by either increasing a charge or decreasing an ink pressure. For such compensation, it has been customary to adjust an ink pressure or a charging voltage by detecting a deflection or flying velocity of ink droplets, such as disclosed in Japanese Patent Application No. 55-100918/1980 and U.S. Pat. No. 3,787,882.

However, various problems must be settled to control the deflection of charged ink droplets to an optimum value. For example, though a control may be made such that one ink droplet be deflected to an optimum deflection, a plurality of ink droplets fly one after another in practice so that a due countermeasure has to be taken against misdeflection originating from Coulomb's force air resistances and the like acting between adjacent ink droplets. In a modern ink jet printer, charge compensation coefficients or respective steps of reference charging voltage are predetermined to compensate for a distortion of a deflection path attributable to an electric field developed by the preceding charged ink droplet, or a disturbance to the deflection path due to Coulomb's force or irregular distribution of air resistances. Therefore, at least the charge compensation coefficients or the various steps of reference charging voltage should preferably be prevented from being affected by the deflection control. That is, such compensation should preferably be performed by calculation with constants or like processing regardless of the deflection control. Thus, a deflection control relying on a control of the ink pressure instead of the charging voltage will prevent a simultaneous shift of the charging voltage to enable the calculation with constants, and, thereby, facilitate a control of the charging operation for printing purpose.

SUMMARY OF THE INVENTION

A deflection control type ink jet printing apparatus embodying the present invention comprises an ink ejection head for ejection of a jet ink, charging means for electrostatically and selectively charging ink droplets separated from the jet of ink, deflection means for electrostatically deflecting the charged ink droplets to a plurality of predetermined steps in accordance with the electrostatic charges on the ink droplets, deflection detecting means for detecting a deviation from a reference deflection of a deflection of the charged ink droplets which are deflected to predetermined one of the plurality of steps, ink supply means for supplying an ink under a predetermined variable pressure to the head, and control means for controlling the ink supply means to vary the pressure to be applied to the ink in accordance with a deviation detected by said deflection detecting means.

In accordance with the present invention, a deflection control type ink jet printing apparatus includes a pair of parallel electrodes located downstream of a deflection electrode with respect to an intended direction of ink ejection from an ink ejection head. The electrodes sense a deviation or offset of an actual path of deflection which ink droplets deflected to predetermined one of a plurality of steps follow from a reference path of deflection, which is defined intermediate between the two electrodes. An ink is fed to the head under a pressure which is variable in accordance with the sensed deviation in deflection in order to compensate for the deviation. The two electrodes may be replaced by at least one electrode on which ink droplets deflected to a specific deflection step are to impinge.

It is accordingly an object of the present invention to provide a deflection control type ink jet printing apparatus which is capable of detecting a proper amount of deflection of ink droplets.

It is another object of the present invention to provide a deflection control type ink jet printing apparatus comprising means for automatically adjusting ink jet deflection to an optimum value.

It is another object of the present invention to provide a deflection control type ink jet printing apparatus which includes means for performing a deflection control by suitably adjusting an ink pressure to match it with a deflection of an ink droplet without accompanying any change in a charging voltage or a flying velocity of ink droplets.

It is another object of the present invention to provide a deflection control type ink jet printing apparatus which is capable of printing in a manner which is free of distortion.

It is another object of the present invention to provide a deflection control type ink jet printing apparatus which is reliable in operation, provides high quality printing and is economical to manufacture on a commercial production basis.

It is another object of the present invention to provide a generally improved deflection control type ink jet printing apparatus.

Other objects, together with the foregoing, are attained in the embodiments described in the following description and illustrated in the accompanying drawings.

BRIEF DESCRIPTION OF THE DRAWINGS

FIGS. 17*b*-1 to 17*b*-4, are flowcharts indicating another control operation of the microcomputer;

DESCRIPTION OF THE PREFERRED EMBODIMENTS

While the deflection control type ink jet printing apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
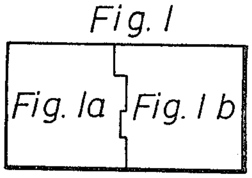
FIG. 1, consisting of component
Figure 1A:
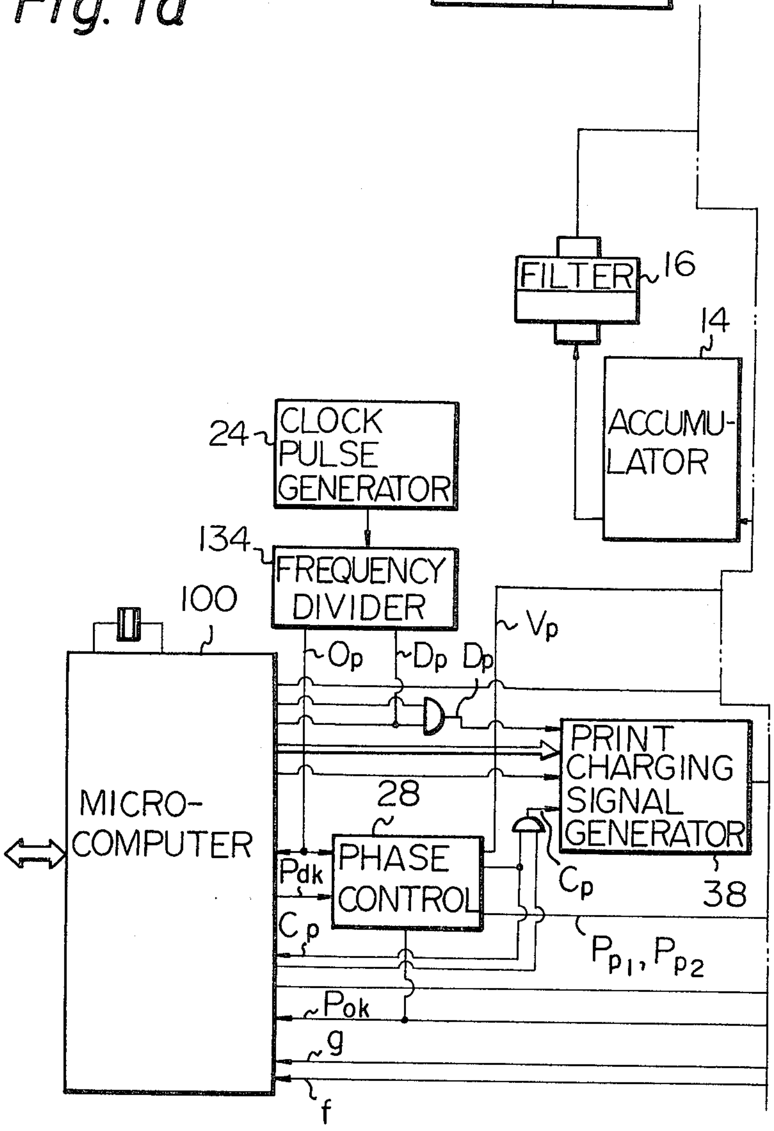
FIGS. 1*a* and 1*b*, is a block diagram of a deflection control type ink jet printing apparatus embodying the present invention.
Figure 1B:
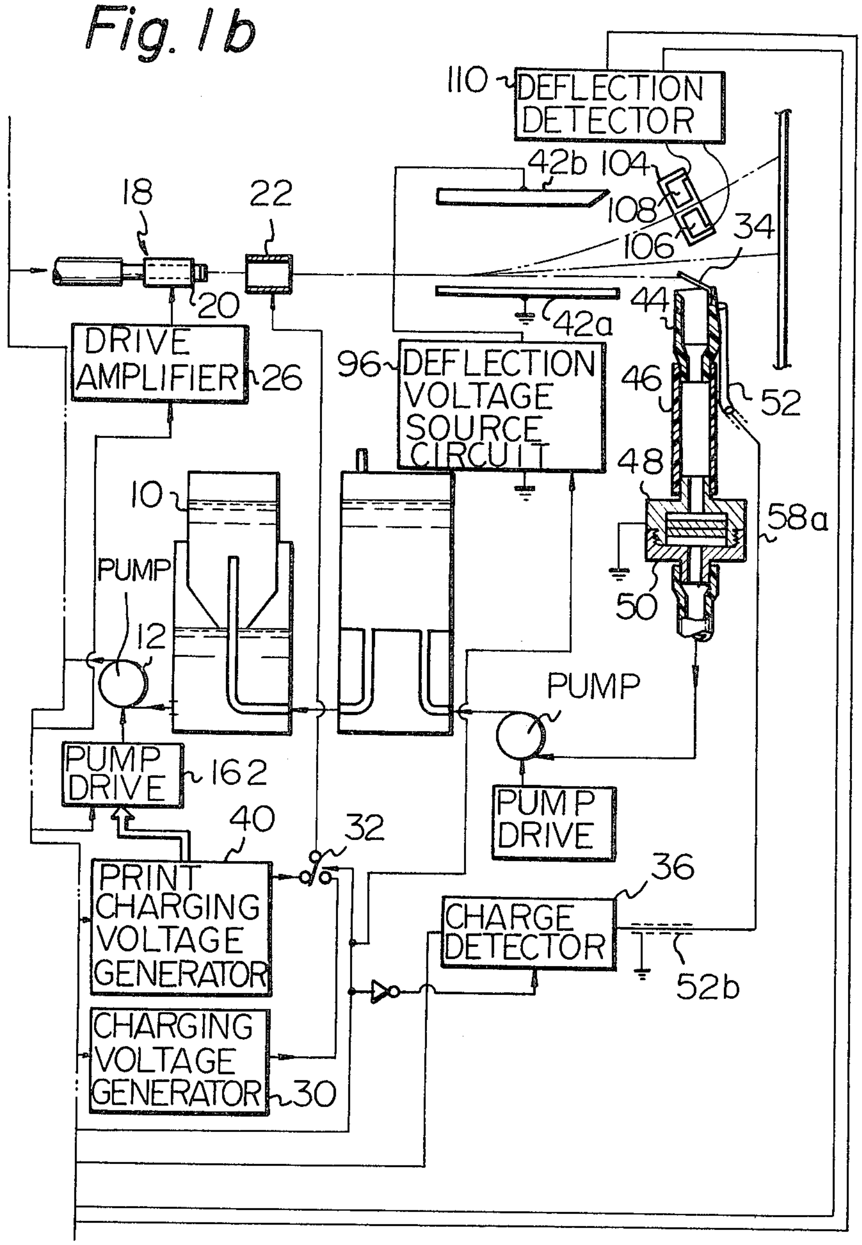

Referring to FIG. 1 of the drawings, the ink jet printing apparatus includes a pump 12 for pumping an ink from a cartridge 10 to an accumulator 14. Ink from the accumulator is supplied under even pressure to an ink ejection head 18 which is generally designated by the reference numeral 18. The ink ejection head 18 has therein an electrostrictive vibrator 20 which applies a predetermined frequency of vibration to the ink when supplied with a drive voltage. Thus, the ink under vibration is ejected from a nozzle of the ink ejection head 18. At a position spaced a predetermined distance from the nozzle, the jet of ink separates into droplets at a predetermined period which is identical with the period of the vibration. A charging electrode 22 located at the position of ink separation is impressed with a charging voltage which has a stepwisely variable level, "0" level (e.g. ground level) under non-printing condition wherein an image signal is logical "0". The charging pulse must be applied in the form of voltage pulses to the charging electrode 22 and, moreover, the supply of each step of charging voltage has to be timed to a certain phase in which ink droplets are formed. These requirements are generally met by a phase search which determines a drive phase for the electrostrictive vibrator 20 relative to the charging voltage pulse phase.

For a phase search mode operation, a frequency divided version of output clock of a clock pulse generator 24 is coupled to a drive amplifier circuit 26 so as to prepare a sinusoidal wave which is synchronous with the clock. The sinusoidal wave is coupled to the electrostrictive vibrator 20 in the head 18. The output clock of the clock pulse generator 24 is also fed to a phase control circuit 28 to be thereby transformed into charging clock of a predetermined pulse duration which has a given phase difference relative to the clock phase. The charging clock is supplied to a phase search charging voltage generator 30 which then generates phase search charging pulses of a short duration and a constant level and identical or opposite in polarity to the charging voltage. The output of the charging voltage generator 30 is supplied through a switching circuit 32 to the charging electrode 22. Charging of an ink droplet is detected by a gutter 34 and a charge detection circuit 36 electrically connected therewith. When the charge detection circuit 36 produces a detection signal indicating charging of an ink droplet before the formation of a predetermined number of droplets, the phase search is terminated; otherwise, a one-step phase shift command is supplied to the phase control circuit 28 so that the drive pulses for the separation of ink are shifted in phase a predetermined amount.

After the phase search, a charging signal having a stepwisely variable level prepared by a print charging signal generator 38 based on the charging clock is fed to the charging electrode 22 via a print charging voltage generator 40 and the switching circuit 32, thereby causing the system into a print mode operation. At the charging electrode 22, the charging signal whose level is thus variable in synchronism with the charging clock deposites a variable electrostatic charge on ink droplets. Then, each ink droplet is deflected by an electric field between deflection electrodes 42*a* and 42*b* in proportion to its specific charge. While the image signal is logical "0" level, the charging voltage is "0" level so that ink droplets are not charged but collected by the gutter 34.

The gutter 34 is made of a conductive material and rigidly connected to a gutter holder 44 which is made of an insulating material. The gutter holder 46 is connected to a filter 48 by an insulating tube 46. The filter 48 has a filtering member stored in a conductive casing 50 which is grounded. The conductive gutter 34 is connected with one end of a core 52*a* of a shielding wire 52 the other end of which is connected to the charge detection circuit 26. The covering 52*b* of the shielding wire 52 is grounded.

Figure 2:
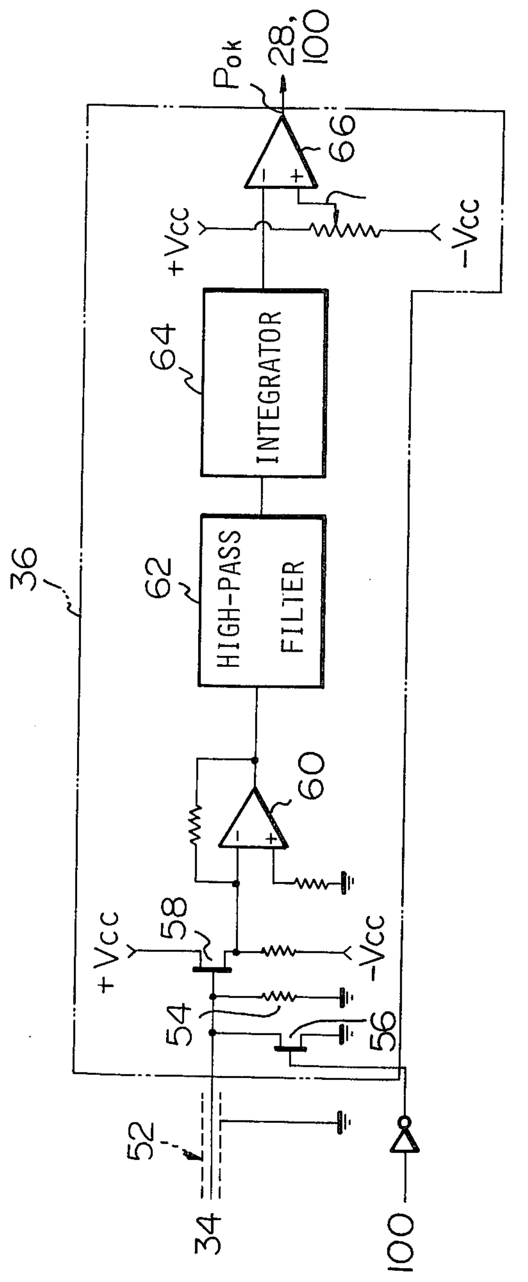
FIG. 2 is a block diagram of a charge detection circuit included in the printer of FIG. 1.

Referring to FIG. 2, the charge detection circuit 36 includes a voltage converting resistor 54 whose resistance is smaller than a resistance $R_G$ between the gutter 34 and the ground of the filter 48 (FIG. 1), so that the grounding resistor at the side of the gutter 34 is safeguarded against instability due to the fluctuation of the resistance $R_G$. The circuit 36 also includes a filed effect transistor 56 for grounding the gutter, a second field effect transistor 58 for impedance conversion, an operational amplifier 60, a high-pass filter 62, an integrator 64 for smoothing a dc component and a comparator 66.

Figure 3:
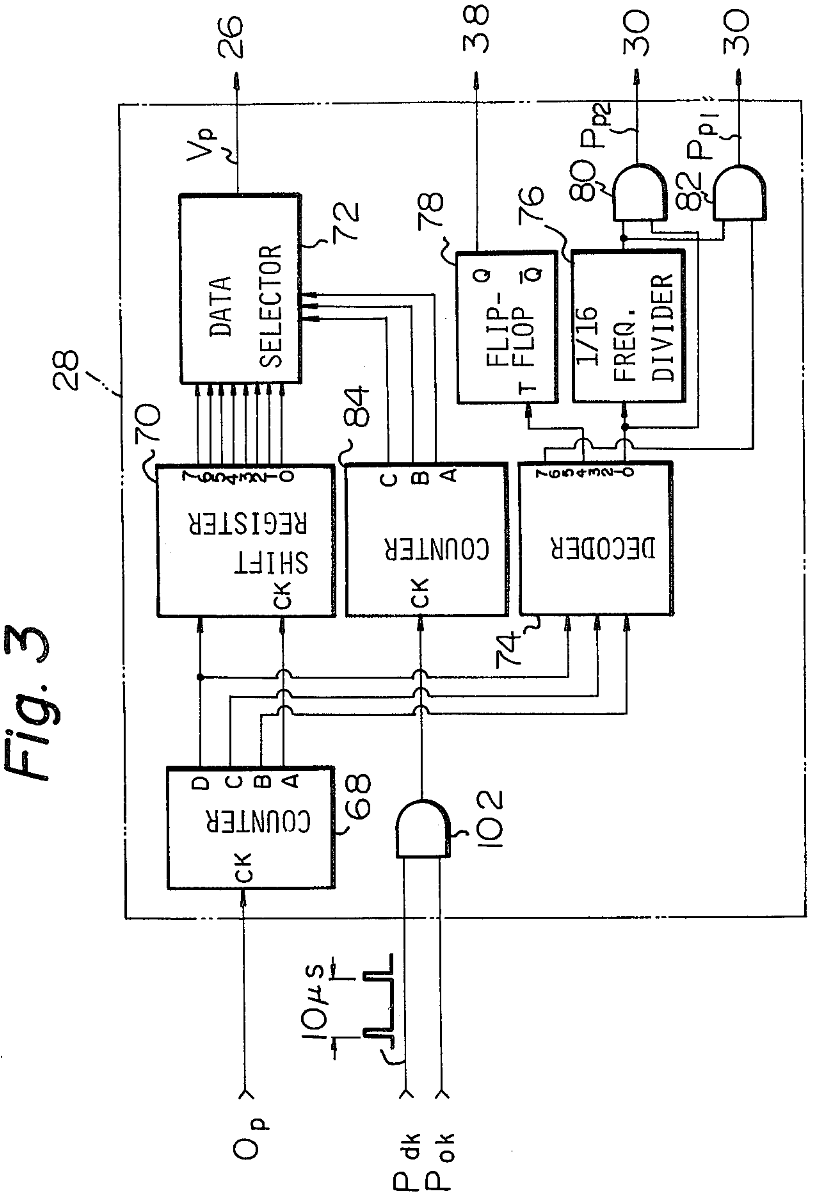
FIG. 3 is a block diagram of a phase control circuit of the printer of FIG. 1.
Figure 4A:
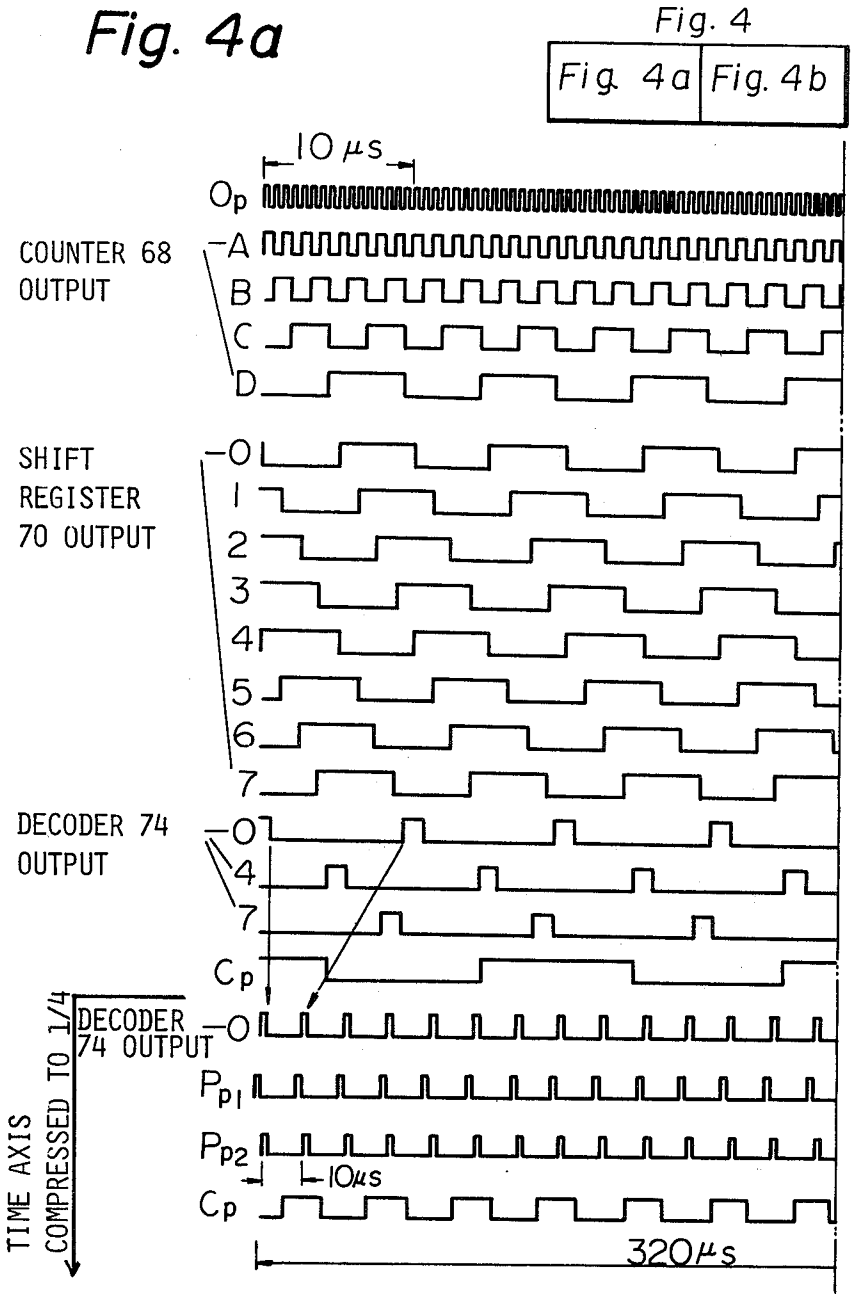
FIGS. 4*a* and 4*b*, is a timing chart demonstrating an operation of the phase control circuit.
Figure 4B:
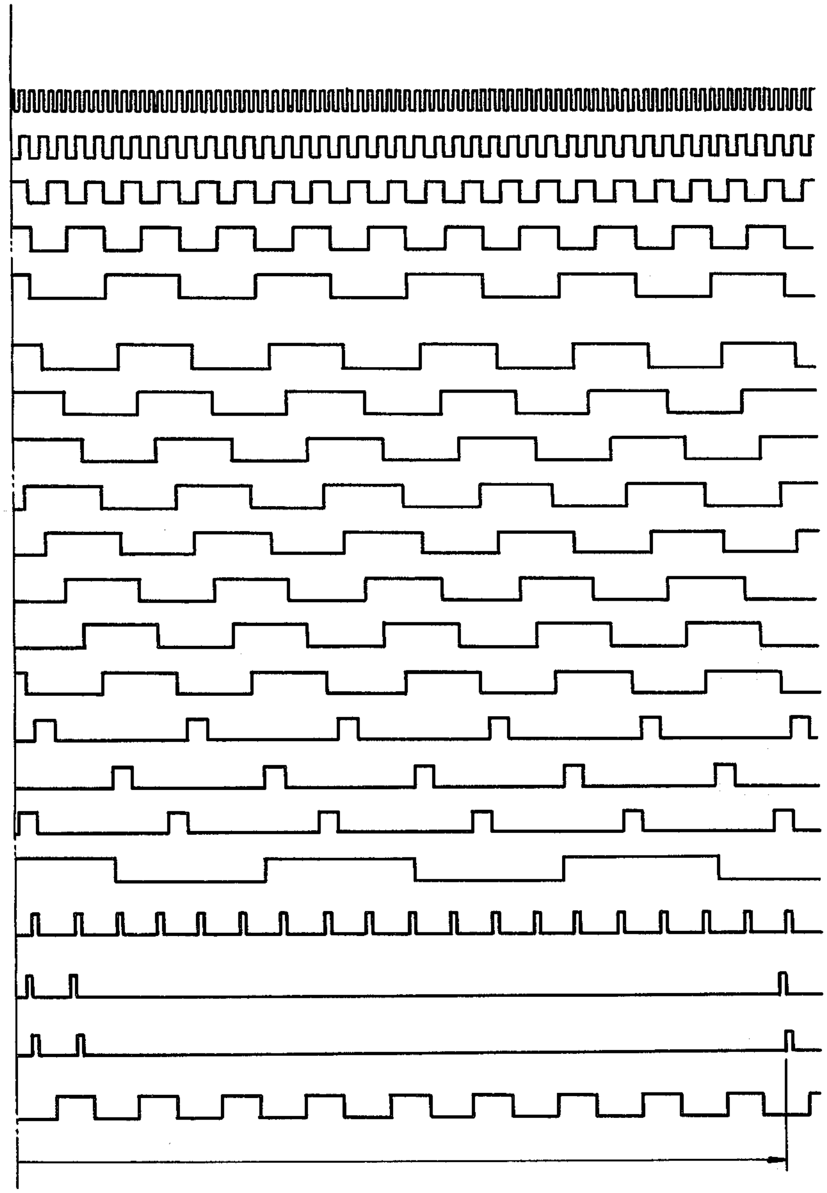
Figure 17A:
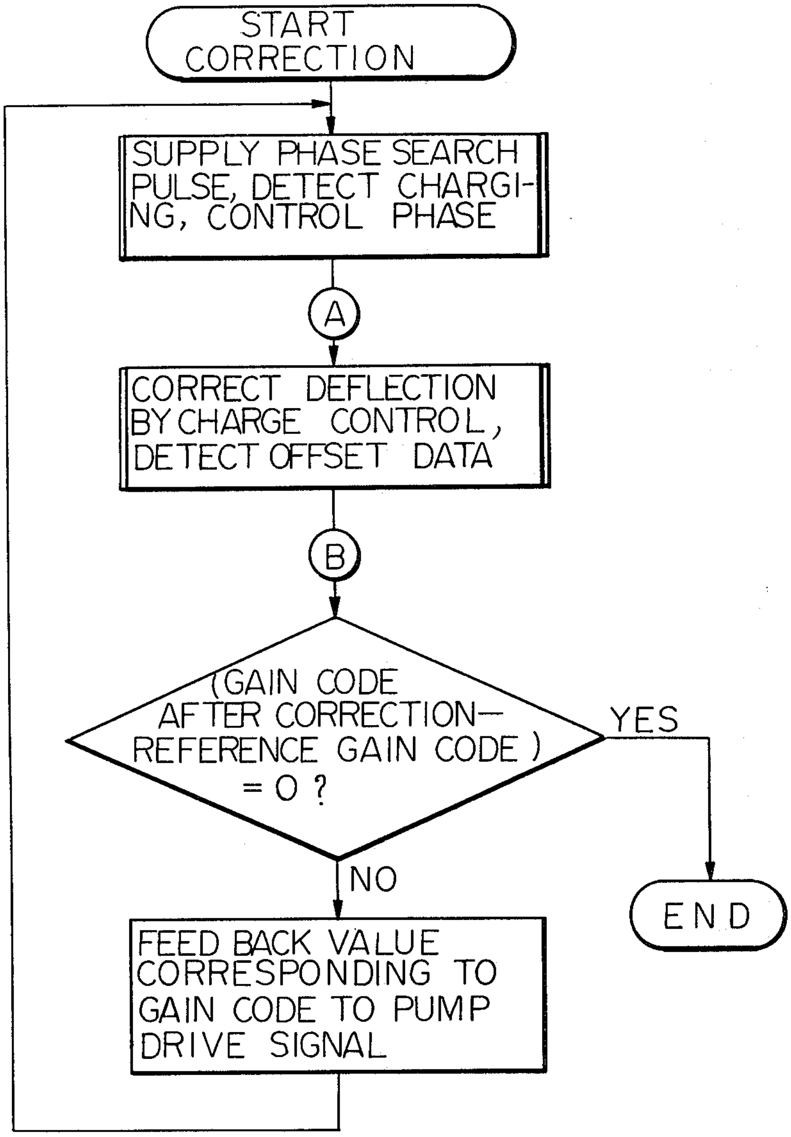
FIGS. 17*a* and 17*b* , consisting of component
Figures 1, 17B:
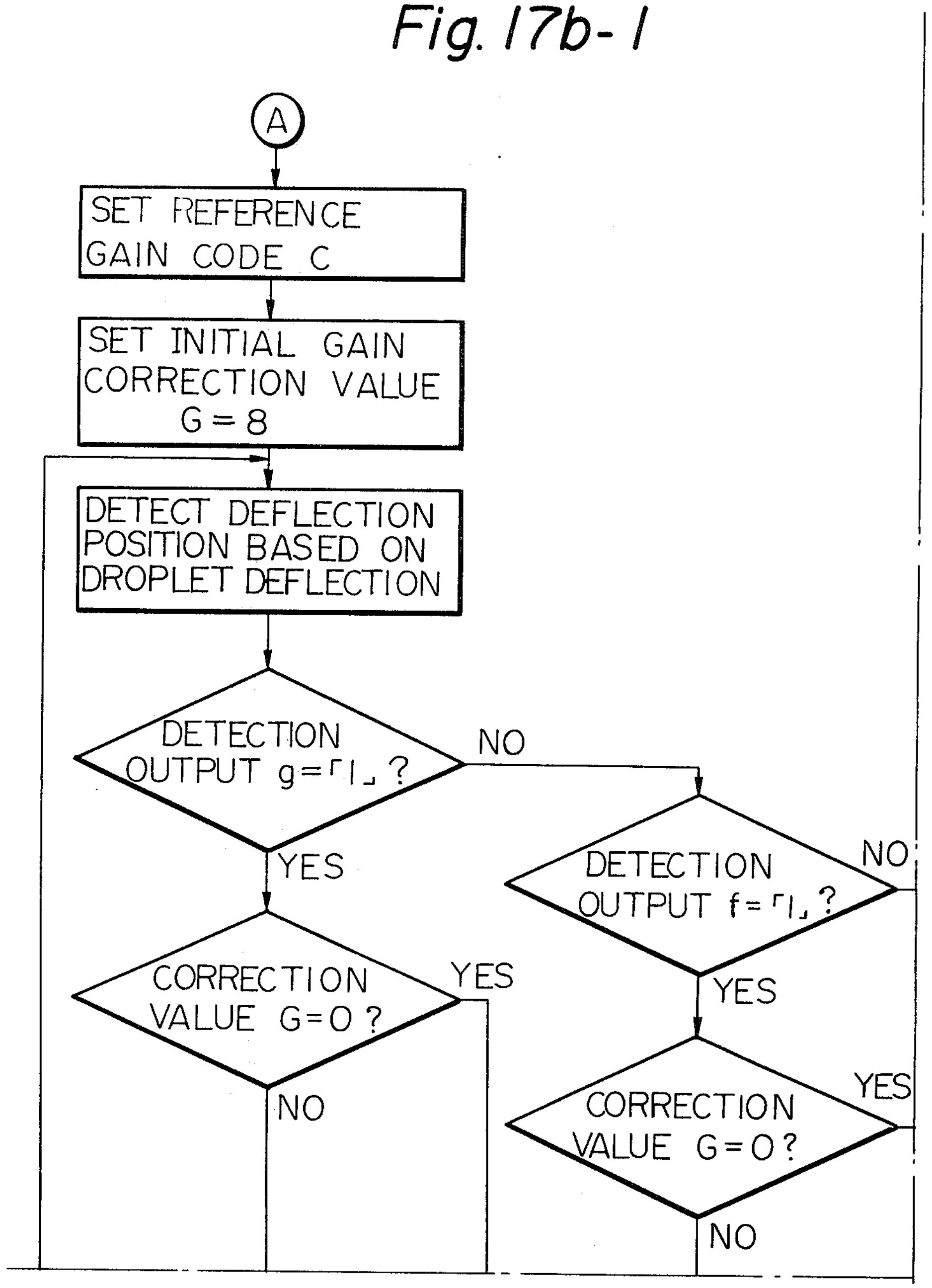
Figures 2, 17B:
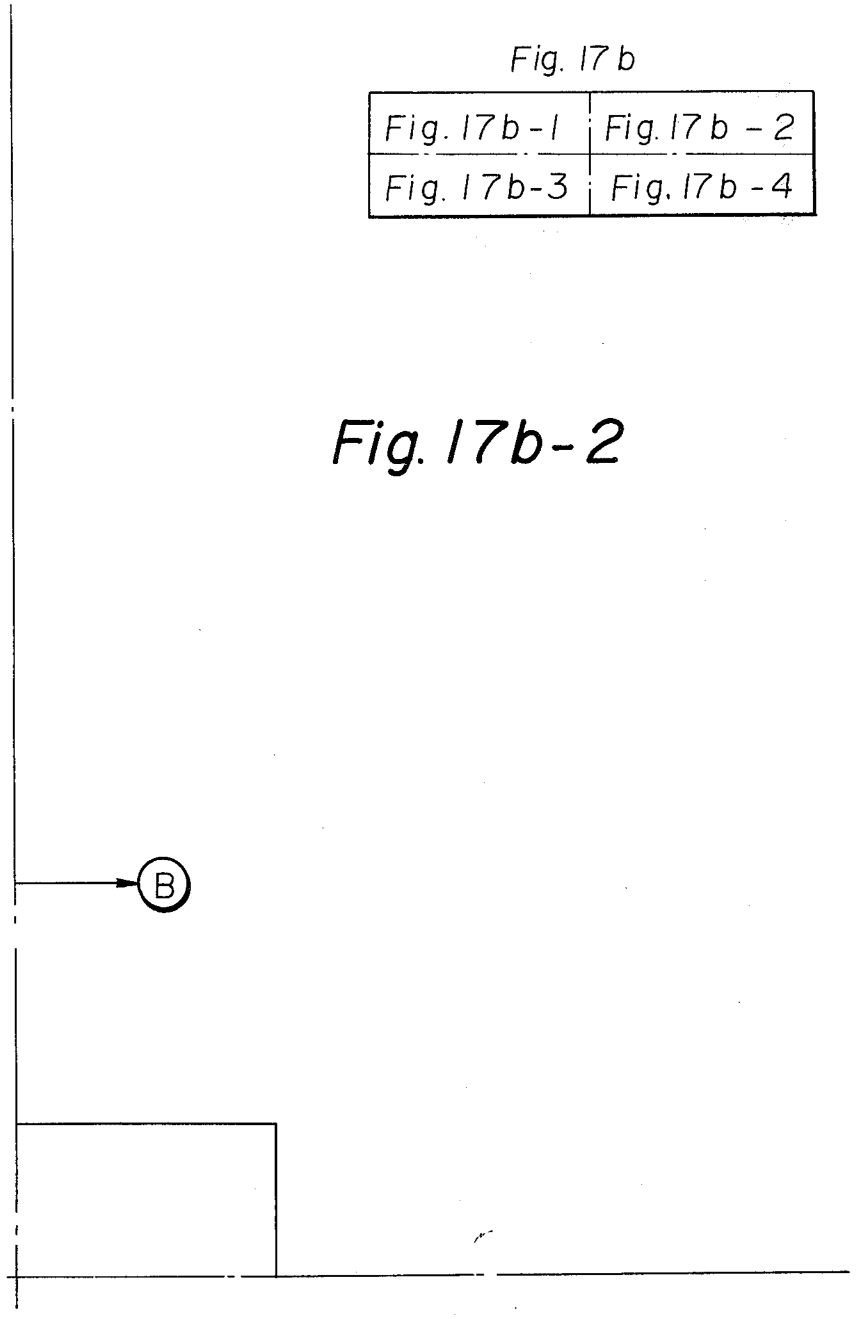
Figures 3, 17B:
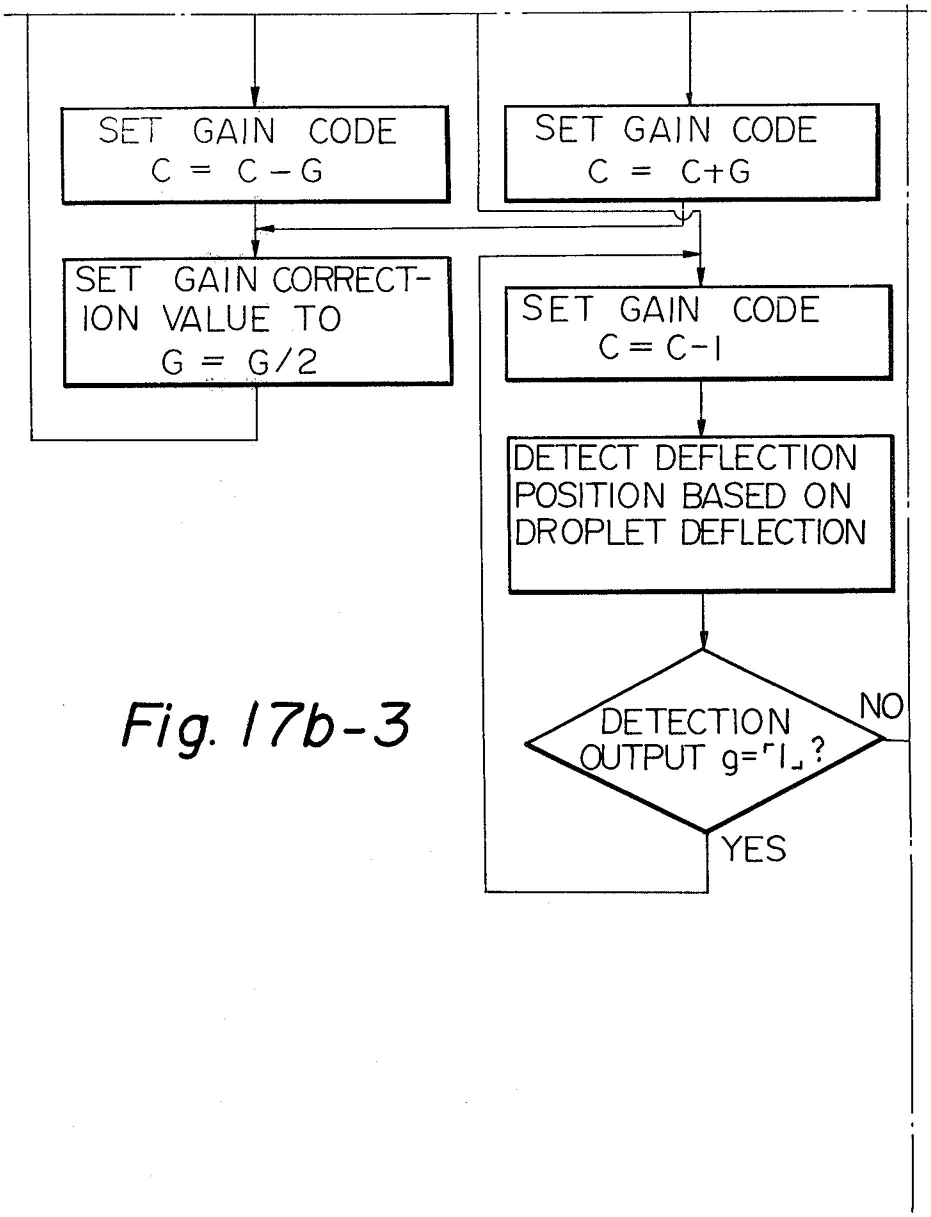
Figures 4, 17B:
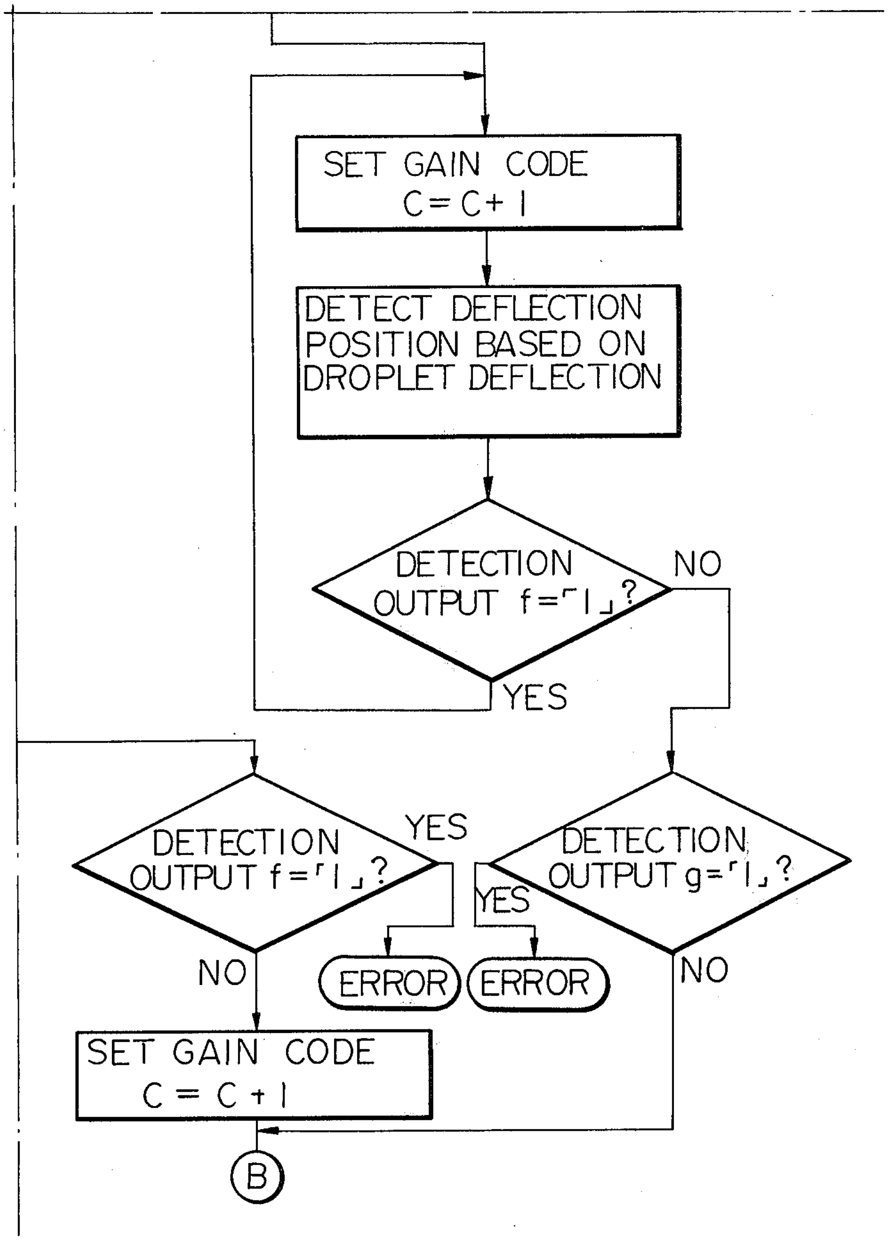
FIG. 4, consisting of component

Referring to FIGS. 3 and 4, the construction and operation of the phase control circuit 28 will be described. The phase control circuit 28 is supplied with clock pulses $O_P$ and its counter 68 counts them up. The counter 68 produces a count code having four bits A–D which correspond to the first to fourth digits, respectively. Of these bits, the bits A and D are coupled to a serial-in parallel-out shift register 70 as a shift pulse and an input signal, respectively. Accordingly, pulses common in duration to the output pulses D of the counter 68 appear at output terminals 0–7 of the shift register 70 at phases which are sequentially deviated each by a period A. A data selector 72 selects one of the outputs of the shift register 70 and feeds it to the drive amplifier circuit 26. The output bits B-D of the couter 68 are coupled to a decoder 74 whose output pulses at the first output terminal 0 and the fifth output terminal 4 are coupled to a frequency divider 76 and a T-type flip-flop 78, respectively. The Q output of the flip-flop 78 is supplied as a charge timing signal Cp to the print charging signal generator 38. The pulses from the output terminal 0 of the decoder 74 are divided by the frequency divider 76 to 1/16, shaped by an AND gate 80 to their original duration and then fed to the charging voltage generator 30 as charging signal pulses $Pp_2$ for phase search. The 1/16 output pulses of the frequency divider 76 are also coupled to an AND gate 82 to be thereby shaped to the duration of the output pulses appearing at the output terminal 7 of the decoder 74 and, thereafter, fed to the charging voltage generator 30 as another set of phase search charging pulses $Pp_1$. Each of these phase search charging signals $Pp_1$ and $Pp_2$ is shown in FIG. 4 to have a train of sixteen successive pulses which alternates with an interruption of the corresponding number of pulses, being repeated at a period of 320 μsec. The print charge timing signal Cp, on the other hand, is a continuous train of pulses each having a duration (logical "1" level) which is eight times the duration of the pulses $Pp_1$ or $Pp_2$ with the latter occurring substantially at the center of the former.

In the illustrated embodiment, whereas the phases of the phase search charging pulses $Pp_1$ and $Pp_2$ and print charge timing pulses Cp are fixed, the phase of the drive pulses Vp for the vibrator 20 is shifted or varied depending on the outputs 0-7 of the shift register 70 which the data selector 72 selectively produces in accordance with a count code A-C from the counter 84. In other words, while the charging voltage pulses have a fixed phase, the separation phase of ink into droplets is shiftable.

Figure 5:
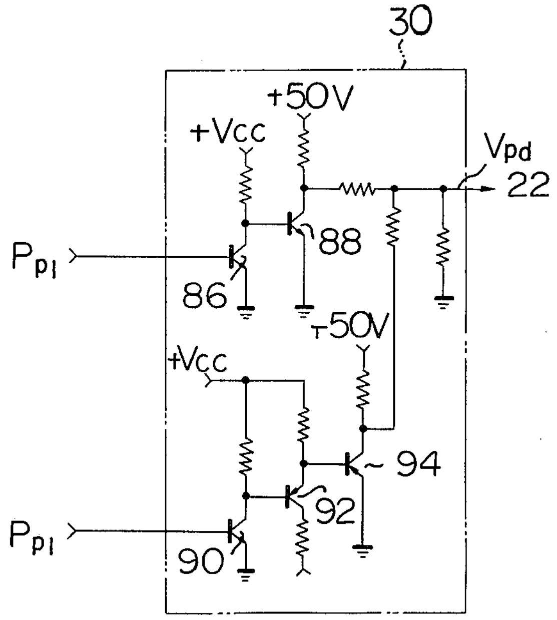
FIG. 5 is a diagram showing a phase search charging voltage generator of FIG. 1.
Figure 6:
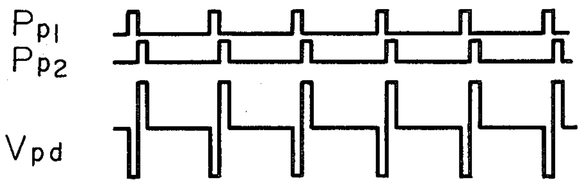
FIG. 6 is a timing chart demonstrating an operation of the phase search charging voltage generator shown in FIG. 5.

The charging voltage generator 30 for amplifying the phase search charging pulses $Pp_1$ and $Pp_2$ to produce a charging voltage is constructed as shown in FIG. 5 and operated as shown in FIG. 6. The pulses $Pp_1$ are coupled to the base of a transistor 86 and then amplified by a transistor 88 to the +50 V level. The pulses $Pp_2$ are amplified to the −50 V level by transistors 90, 92 and 94. With this arrangement, the voltage pulses Vpd of opposite polarities are fed to the charging electrode 22 during a phase search operation mode.

Referring to FIGS. 1–6, in a phase search operation mode, a phase search command signal is made (logical) "1" level to condition the switching circuit (or relay) 32 such that the phase search charging voltage generator 30 is connected with the charging electrode 22. At the same time, a deflection voltage source circuit 96 is switched off and the transistor 56 of the charge detection circuit 36 is rendered non-conductive. Under this condition, the charging voltage generator 30 supplies the charging electrode 22 with phase search charging pulses timed to the phase search charging pulses $Pp_1$ and $Pp_2$ which intermittently appear at the 320 μsec period and each of which has a duration of 10 μsec. Supposing that the count code output of the counter 84 is "000", pulses appearing at the output terminal C of the shift register 70 are coupled to the drive amplifier circuit 26 as drive pulses Vp so that the jet of ink is separated into droplets at a phase corresponding to the period and the phase (relative to the pulses $Pp_1$ and $Pp_2$) of the drive pulses Vp. If the separation of ink is timed to either the pulses $Pp_1$ or the pulses $Pp_2$, the droplets are charged to the positive polarity and impinge on the gutter 34. That is, a charge pattern of the 320 μsec period is generated in which successive sixteen droplets are charged but not the next successive sixteen droplets, and all the ink droplets impinge on the gutter 34. The gutter potential, therefore, undergoes a fluctuation which is similar to the charge pattern. However, the base potential of the charge detection circuit 36 fluctuates in such a manner as a sinusoidal wave or an envelope of the 320 μsec period due to the floating capacity of the shielding wire 52, ink resistance $R_G$ between the gutter 32 and the ground and the time constant of an input resistor 54. Such a sinusoidal voltage is inverted and amplified by the operational amplifier 60 and coupled to the high-pass filter 62. The high-pass filter 62 cuts off noise whose period is short of 320 μsec. The integrator 64 smoothes the 320 μsec sinusoidal wave to stabilize it at a constant dc level. This dc voltage is compared with a reference voltage Vref at the comparator 66. If the dc voltage is higher than the reference voltage Vref, that is, when an ink droplet has been charged, the output level of the comparator 66 becomes "0" level; when ink droplets have not been charged or charged incompletely, the output level of the comparator 66 remains "1" level.

The output of the comparator 66 is supplied to a microcomputer 100 (see FIG. 1) of a print control unit and to an AND gate 102 of the phase control circuit 28. After making the phase search signal "1" level, the microcomputer 100 feeds determination pulses Pdk to the AND gate 102 of the phase control circuit 28 at a period of 10 μsec. When the output Pok of the comparator 66 becomes "0" level indicating "charged" , the microcomputer 100 stops the delivery of the 10 μsec period pulses Pdk and starts on a print charging control. Therefore, while the output of the comparator 66 is "1" level indicating "non-charged", the AND gate 102 supplies the counter 84 with one pulse at every 10 μsec to increment it, whereby the output Vp of the data selector 72 is shifted from an output terminal "i" of the shift register 70 to an output terminal "i+1" (meaning one-step phase shift). The counter 84 is incremented in a circulating manner. While the pulses appearing at one of the output terminals 0–7 of the shift register 70 are fed to the drive amplifier circuit 26 as Vp, an ink droplet will become charged to make the output of the comparator 66 "0" level.

As soon as the output of the comparator 66 turns from "1" level to "0" level during a phase search, the microcomputer 100 makes the phase search command signal "0" level to begin a deflection control and then a printing operation. For these operations, the switching circuit 32 is actuated to connect the print charging voltage generator 40 to the charging electrode 22, the transistor 56 is turned on, and the deflection voltage source circuit 96 is switched on to supply the deflection electrode 42*b* with a constant positive or negative high voltage. The print signal generator 38 generates a reference charging voltage of the maximum deflection level during a deflection control while generating a stepwisely varying voltage during a printing operation. Such a voltage is coupled to the print charging voltage generator 40 when the print data is "1" level commanding a printing actions, during a "0" level period of the pulses Cp.

Since the charging voltage pulses have both the positive and negative polarities during a phase search, it will be seen that the voltage induced in the gutter or the collected ink alternates and, due to the high frequency, is made substantially zero level smoothed by the floating capacity of the shielding wire 52 and the resistor 54 and, thus, it does not appear in the output of the high-pass filter 62. Moreover, in a deflection control and a printing operation, the transistor 56 of the charge detection circuit 36 is turned on to ground the gutter 34 so that no charge is allowed to accumulate on the gutter 34. This prevents the gutter 34 from disturbing the deflection of ink droplets.

Figure 7:
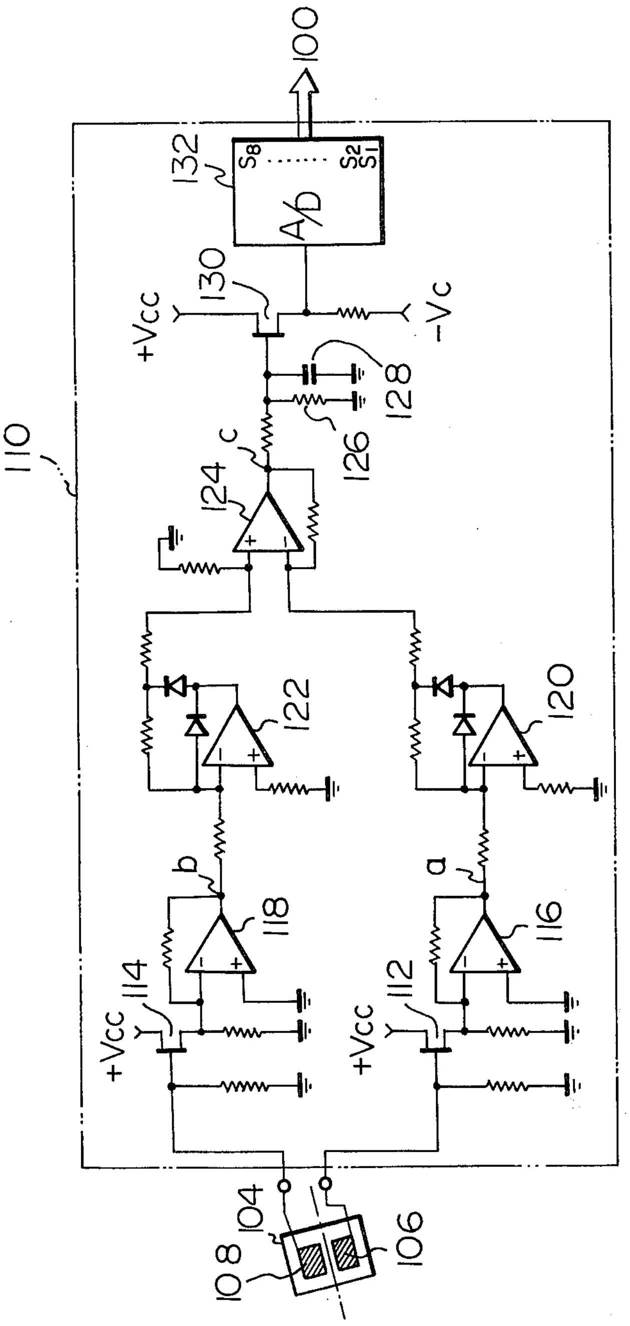
FIG. 7 is a diagram showing a deflection detector circuit of FIG. 1.
Figure 8A:
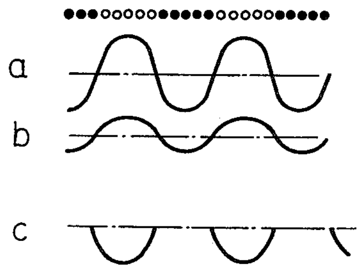
FIGS. 8*a*, 8*b* and 8*c* are timing charts indicating signals appearing at various portions of the deflection detector circuit of FIG. 7.
Figure 8B:
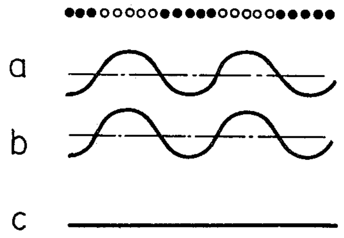
Figure 8C:
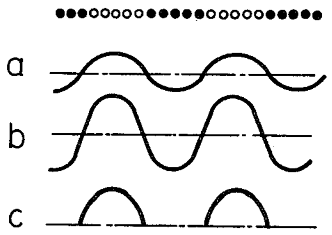

Referring to FIG. 7, a deflection detector circuit 110 shown in FIG. 1 will be discussed in detail. A printed circuit board 104 carries two parallel printed electrodes 106 and 108 thereon and is arranged either adjustably or securely to a side of a specific step of deflection path (32nd step) of charged ink droplets such that the specific deflection path is located intermediate between the electrodes 106 and 108. As a charged ink droplet moves past the electrodes 106 and 108, potentials corresponding to the actual path of the ink droplet and its charge are developed therein due to electrostatic induction. These potentials are individually coupled to the gates of field effect transistors 112 and 114 of the deflection detector 110, amplified by amplifiers 116 and 118, rectified and amplified by amplifiers 120 and 122 and then fed to a differential amplifier 124. The output of the differential amplifier 124 is integrated and smoothed by a capacitor 128, supplied to a field effect transistor 130 and then transformed into digital data by an analog-to-digital or A/D converter 132. The output of the A/D converter 32, that is, the digital data indicating an offset amount of deflection is supplied to the microcomputer 100. For the detection of a deflection in a deflection control, the microcomputer 100 supplies the print charging signal generator 38 with a charging signal (print data) which charges a string of five successive ink droplets but not the next string of five successive ink droplets in synchronism with the charge timing signal Cp. Such a signal is shown in FIGS. 8*a*–8*c* in which charged ink droplets are indicated by black dots and non-charged ink droplets by white dots. Where the actual path of charged ink droplets is offset toward the electrode 106, the output a of the amplifier 116 is larger than that b of the amplifier 118 so that the output c of the differential amplifier 124 becomes negative level as shown in FIG. 8*a*. This level corresponds to an offset to a short deflection range with respect to the reference path. As long as the actual path is in register with the reference path between the electrodes 106 and 108, the outputs a and b of the amplifiers 116 and 118 are equal to each other allowing the output c of the differential amplifier 124 to remain zero level as shown in FIG. 8*b*. As the actual path becomes offset toward the printed electrode 108 with respect to the reference path, the output b of the amplifier 118 grows larger than that a of the amplifier 116 whereby the output c of the differential amplifier 124 is made positive level as shown in FIG. 8*c*. This level corresponds to an offset to an excessive deflection range. The offset data is delivered through the A/D converter 132 to the microcomputer 100 which then varies the ink pressure based on the input data.

Figure 9:
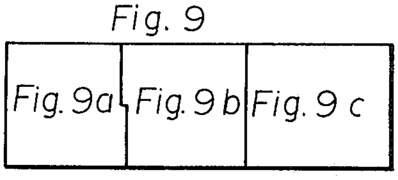
FIG. 9, consisting of component
Figure 9A:
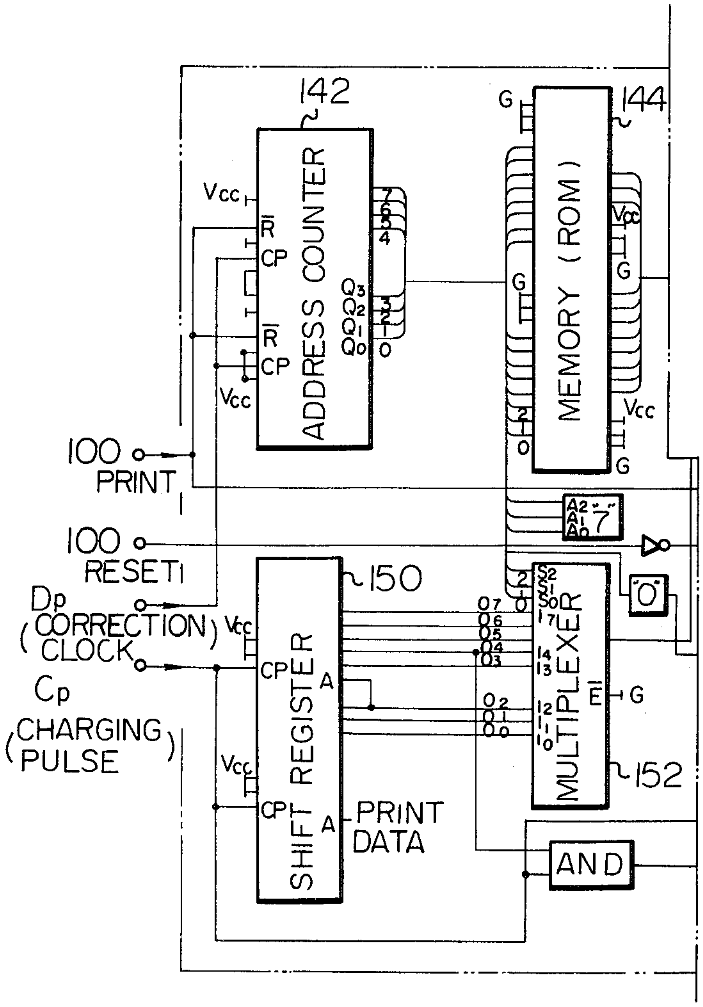
FIGS. 9*a* and 9*c*, is a block diagram of a print charging signal generator and a print charging voltage generator of FIG. 1.
Figure 9B:
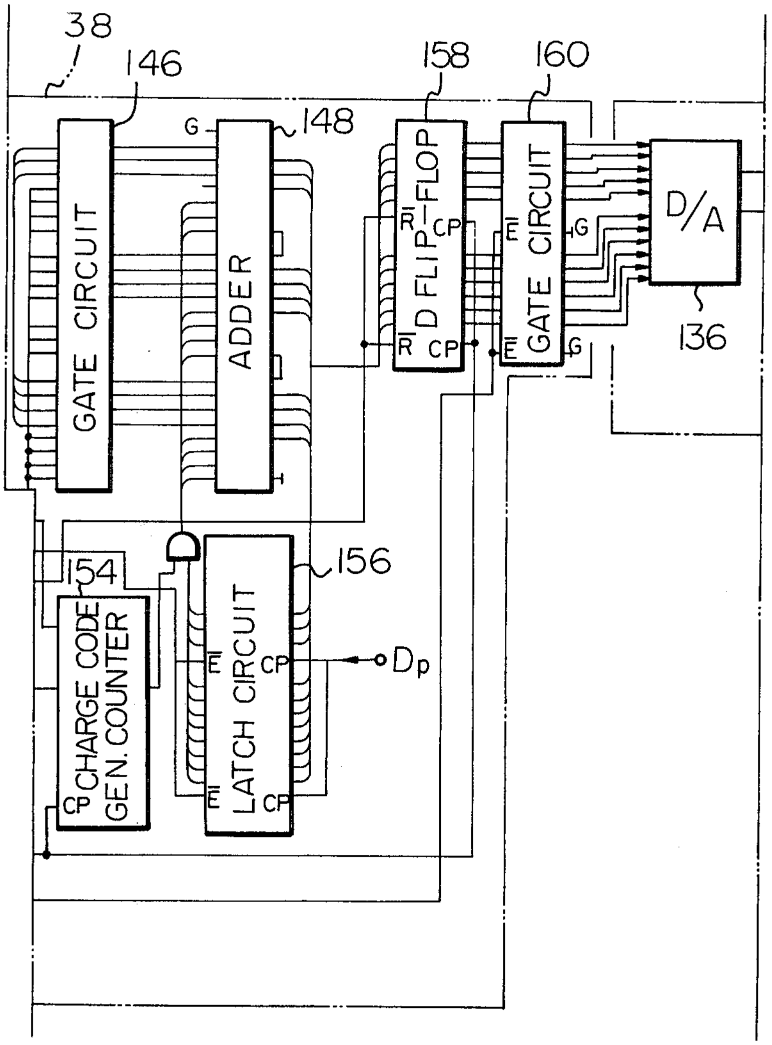
Figure 9C:
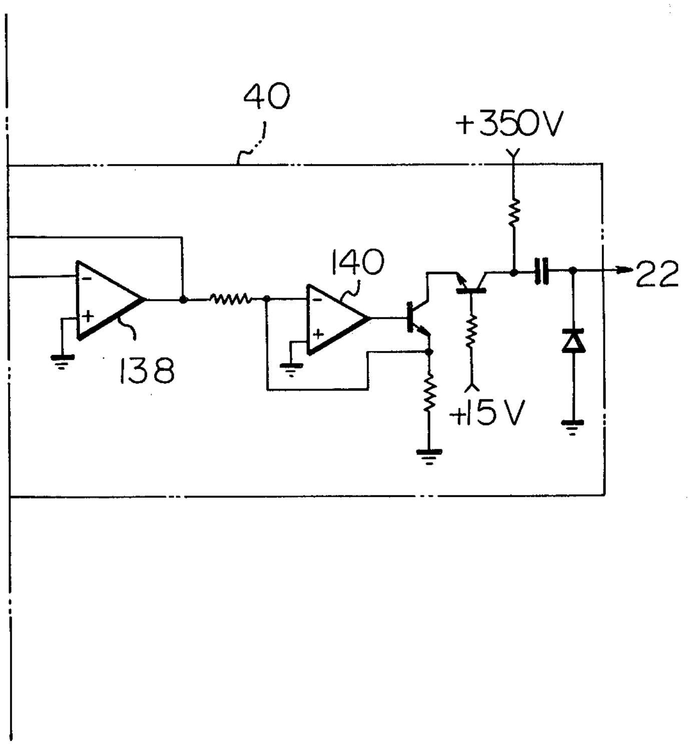

Reference will now be made to FIG. 9 for describing the constructions of the print charging signal generator 38 and print charging voltage generator 40. Let it be supposed that the drive frequency Vp for the head is 100 kHz and that one guard drop is provided for reducing distortion. Thus, the charging frequency Cp to the ink droplets is 50 kHz. The charging voltage is variable within the range of 50–240 V depending on the input. In FIG. 1, clock pulses oscillated by the clock pulse generator 24 are divided by a frequency divider 134. The output Op of the frequency divider 134 is a reference pulse whose frequency is 1.6 MHz and the other output Dp is correction clock.

The print charging signal generator 38 stores correction values, sequentially reads them out and determines whether or not to add them to corresponding data depending on the presence/absence of the latter. The summation output is supplied to the print charging voltage generator 40. In the print charging voltage generator 40, the input is transformed into an analog signal by a digital-to-analog or D/A converter 136 and amplified by amplifiers 138 and 140. The amplified output is coupled to the charging electrode 22. Thus, the correction values are stored as binary data in a read-only memory (ROM), a random access memory (RAM) or the like in the print charging signal generator 38. Meanwhile, individual ink droplets are counteracted by different air resistances depending on their deflections so that their deflections are not linearly related with the charge codes; assuming that the deflections are spaced a common distance, the charge codes are non-linear. Hence, distortions from straight lines are stored as correction values in the memory. Stated another way, stored in the memory are not only the correction values concerned with print data but the correction values concerned with non-linearity of individual ink droplets. These correction values are indicated in a hexadecimal mode. The charge code has eleven bits which are divided into a block of three bits, a block of four bits and a block of the other four bits for octal hexadecimal indication.

The print charging signal generator 38 shown in FIG. 9 comprises an address counter 142, a memory (ROM) 144, a gate circuit 146, an adder 148, a shift register 150, a multiplexer 152, a charging code generation counter 154, a latch circuit 156, a D-type flip-flop 158 and a gate circuit 160.

In operation, when the print signal becomes (logical) "1", the address counter 142 is made operable and incremented by the correction clock signal Dp. Since the correction clock signal Dp occurs at a frequency eight times the frequency of the charging signal, eight data are read during one period of the charging signal.

The print data are delayed by the shift register 150. The output $O_3$ of the shift register 150 indicates data to be charged. That is, the outputs $O_0$, $O_1$ and $O_2$ indicate the following charged ink droplets.

The lower three bits of the address counter 142 are supplied to the multiplexer 152. If the content of the input lower three bits is "0", the multiplexer 152 produces "1" level output because its input $I_0$ is "1" level. This causes a non-linearity correction value (c) to be fed to the adder 148 from the memory 144 via the gate circuit 146. At the same time, the counter 154 is loaded with "200" and sequentially incremented by the charging pulses Cp. When the content of the lower three bits is "0", the counter output is supplied to the adder 148. As a result, a value corrected in non-linearity is supplied from the adder 148 to the latch circuit 156. As the content of the lower three bits becomes "1", the data $O_0$ appears as an output of the multiplexer 152, the content of $O_3$ is controlled by the gate 160 depending on the logical level of the multiplexer 152, and whether to apply it to the adder 148 is controlled in accordance with the print data. As the lower three bits become "2" to "7" successively, $O_1$, $O_2$ and $O_4$–$O_7$ are sequentially selected as an output of the multiplexer 152 and the supply of each correction value to the adder 148 is controlled. The output of the adder 148 is delayed by the latch circuit 156 and added to the next correction value. When the content of the lower three bits becomes "7", the input to the latch circuit 156 is inhibited to make the lower three bits "0".

The output of the adder 148 is also coupled to the D-type flip-flop 158 and sampled at the rise of a charging pulse. A corrected value is therefore stored in the D-type flip-flop 158 and controlled in accordance with the presence/absence of print data; if print data is present, the corrected value is fed as a charge code to the D/A converter 136 to enable correction.

In this manner, the print charging signal generator 38 provides an accurate correction in dependence on the presence/absence of print data and in correspondence with a step of deflection. It will be seen that in the arrangement of FIG. 9 the correction memory needs only $8\times8\times32$ bits since the basic code for charging is generated by the charge code generation counter 154. While the correction has been shown and described in connection with a sequential printing operation, it will be apparent that it is also applicable to a non-sequential printing operation if the correction pattern and basic charging code are rearranged. Though correction has been performed on a specific ink droplet to compensate for the influence thereon of four preceding droplets and three following droplets, such numbers of droplets are not limitative but may be varied depending on the distance between the head and a paper sheet.

During a deflection control, the print charging signal generator 38 controlled by the microcomputer 100 will produce only the charging voltage data (basic code) for the maximum or 32nd step of deflection and correction code while the print data will be made "1" level for five successive pulses Cp and "0" level for the next five successive pulses Cp (see FIGS. *8a–8c*).

Figure 10:
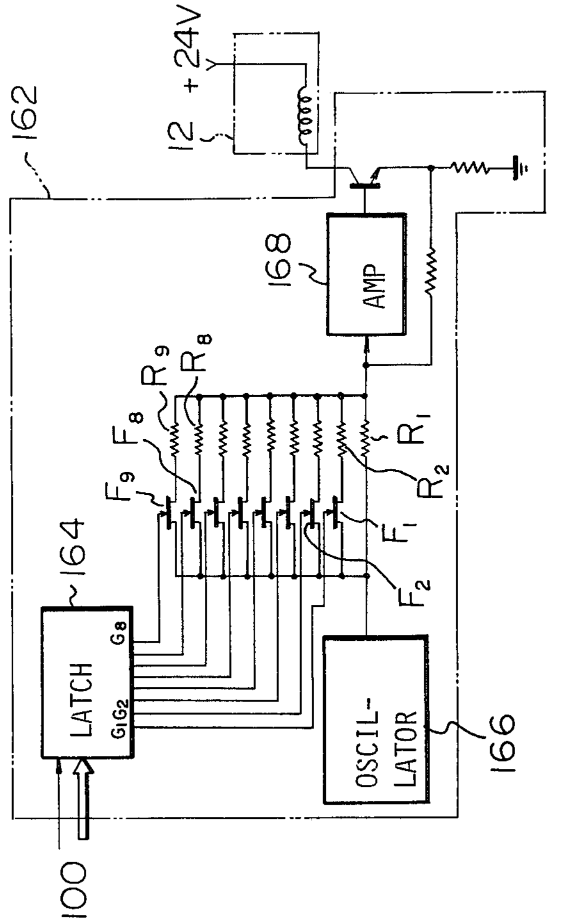
FIG. 10 is a block diagram of a pump driver of FIG. 1.

Referring to FIG. 10, a pump driver 162 shown in FIG. 1 comprises a latch 164, a sinusoidal wave oscillator 166, resistors $R_1$–$R_9$ and field effect transistors $F_1$–$F_9$ for setting a gain and an amplifier 168. The current level for energizing the pump 12 is variable by the resistances of resistors $R_1$–$R_9$ and selective on-off operations of the transistors $F_1$–$F_9$. The on-off conditions of the transistors $F_1$–$F_9$ are determined by data latched in the latch 164 whose load is controlled by the microcomputer 100.

Figure 11:
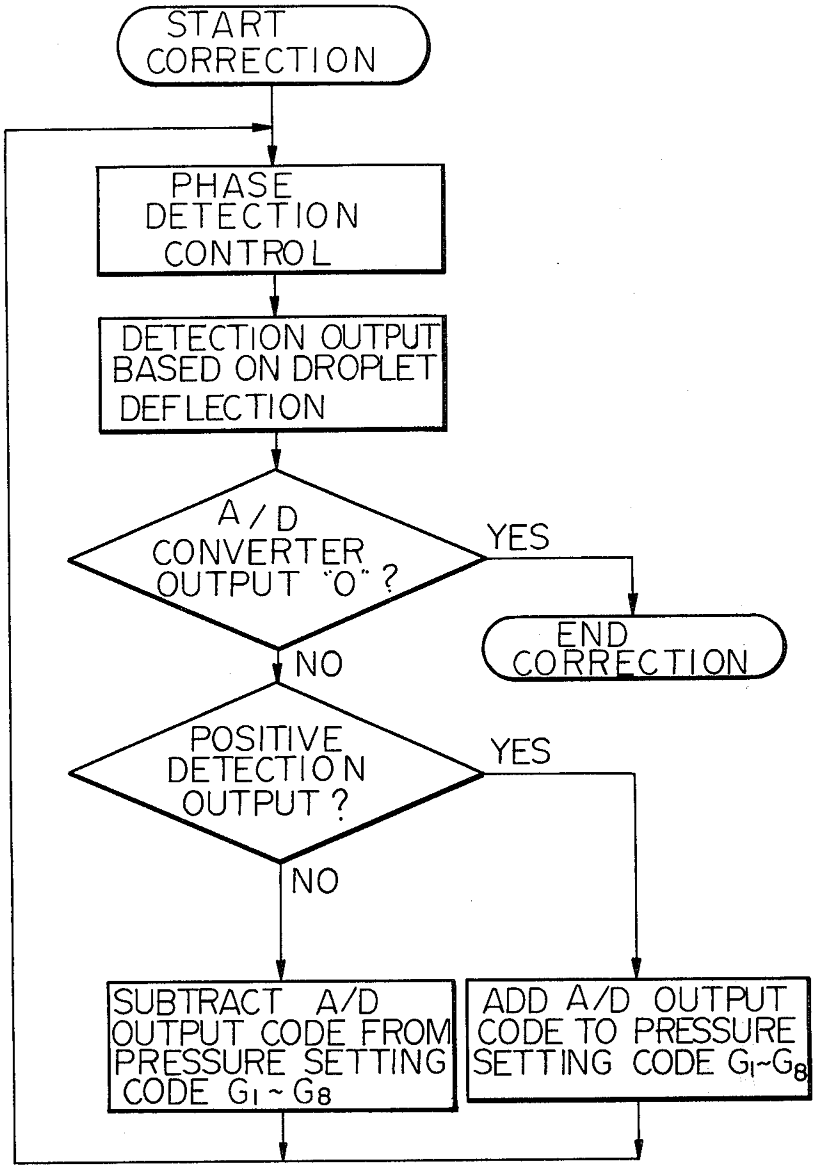
FIG. 11 is a flowchart outlining a control operation of a microcomputer shown in FIG. 1.

FIG. 11 is a flowchart demonstrating operations of the microcomputer 100 for searching a phase and setting a deflection. When supplied with power, the microcomputer 100 initializes its input and output ports and latches reference ink pressure data in the latch circuit 164 to start on a phase search. In a phase search, the deflection voltage source circuit 96 is turned off, the switching circuit 32 is conditioned to connect the phase search charging voltage generator 30 with the charging electrode 22, and the transistor 56 of the charge detection circuit 36 is turned off. Monitoring the output Pok of the charge detector 36, the microcomputer 100 supplies the phase control circuit 28 with phase shift command pulses Pdk at a period of 10 μsec as long as the output Pok remains "1" level. As soon as the output Pok turns to "0" level, the microcomputer 100 stops generation of the pulses Pkd to terminate the phase search determining that an adequate phase for ink separation (Vp) has been set by the phase control circuit 28.

Then, the microcomputer 100 switches on the deflection voltage source circuit 96, connects the print charge voltage generating circuit 40 to the charging electrode 22 via the switching circuit 32 and turns on the transistor 56 of the charge detection circuit 36. The microcomputer 100 sets the print charging signal generator 38 to the 32nd data output, counts charge timing pulses Cp and reverses the print data from recording to non-recording or vice versa every time the count reaches "6". This provides the ink droplet charge pattern shown in FIGS. *8a–8c*. After a predetermined time period of such reversals, the microcomputer 100 reads the output data $S_1$–$S_8$ of the deflection detector circuit 110 and discriminates the polarity from the $S_8$ output (excessive deflection when positive and short deflection when negative). Then, the microcomputer adds the offset data $S_1$–$S_8$ to the currently latched data $G_1$–$G_8$ (when the deflection is excessive) or subtracts the former from the latter (when the deflection is short). The sum or the difference is latched anew in the latch 164. Upon the lapse of a predetermined period of time, the microcomputer 100 repeats the described procedure from the phase search to the replacement of the latched data. When the first offset amount is in the short deflection range, the gain of the amplifier 168 in the pump driver 162 is successively lowered to in turn successively lower the ink pressure until the actual path of charged ink droplets registers with the reference path intermediate between the electrodes 106 and 108. When the first offset amount is in the excessive deflection range, the gain of the same amplifier 168 is successively raised to elevate the ink pressure until the actual path registers with the reference path. As the output data of the A/D converter 132 indicates zero, that is, zero offset, the microcomputer 100 terminates the deflection control and begins to print out data on a paper sheet.

This sets up a situation wherein deflection of a predetermined reference value is attained with the charging voltage controlled to an appropriate level so that a sufficient allowance is ensured for an adjustment of the charging voltage. This implies that the charging voltage and ink pressure have been conditioned to allow the respective data of the print charging signal generator 38 to have correspondence therewith, that is, provided with an ideal condition corresponding to ink temperature. Accordingly, distortion of a charge on an ink droplet due to the charges of the preceding ink droplets, Coulomb's force and air resistance can thus be satisfactorily compensated for using the data stored in the memory of the print charging signal generator 38, promoting data reproduction to a high quality on a paper sheet.

Figure 12:
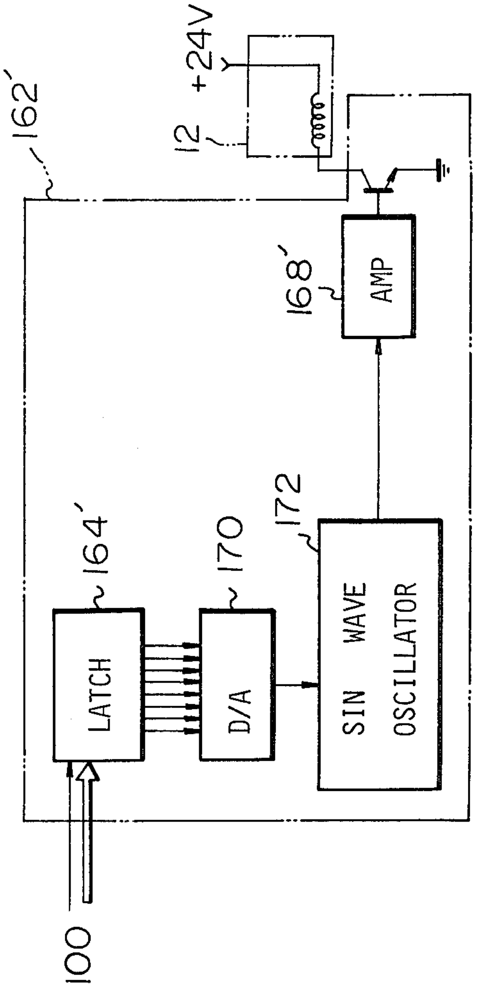
FIGS. 12 and 13 are block diagrams showing modified forms of the pump driver, respectively.
Figure 13:
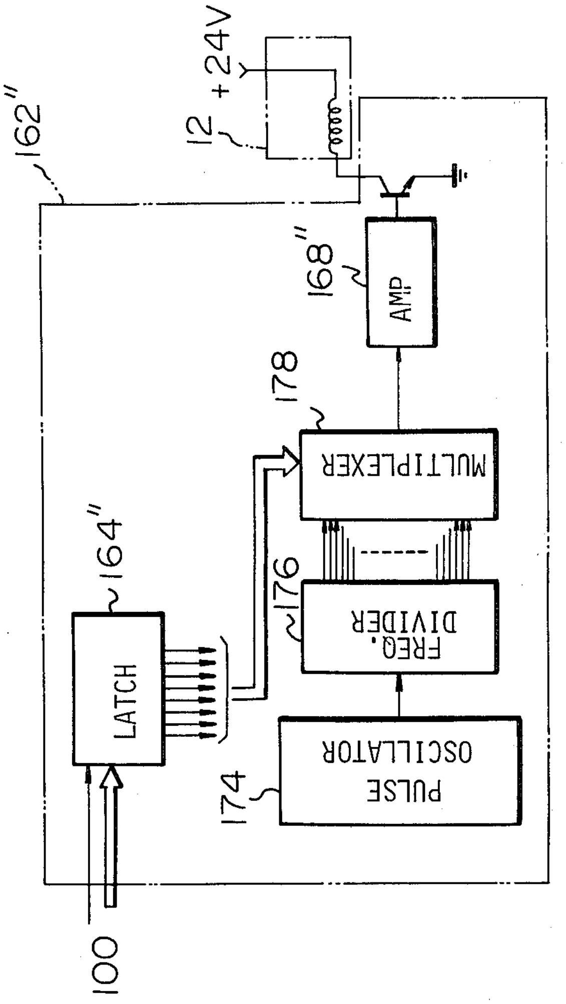

While in the foregoing embodiment the ink pressure is determined by the current supply level to the pump 12, it may be regulated by the drive frequency of the pump 12. For example, as shown in FIG. 12, a pump driver 162' may be constructed such that the latched data is transformed into an analog level by a digital-to-analog or D/A converter 170 and coupled to a frequency control sinusoidal wave oscillator 172. The oscillation frequency of the oscillator (V–F converter) 172 is determined by the latched data. Another alternative pump driver 162'' of the alternative type is shown in FIG. 13 which includes a pulse oscillator 174 whose output pulses are converted by a frequency divider 176 into a plurality of pulses of different periods and one group of such pulses are coupled from a multiplexer 178 to an amplifier 168'' in correspondence with the latched data.

Figure 14:
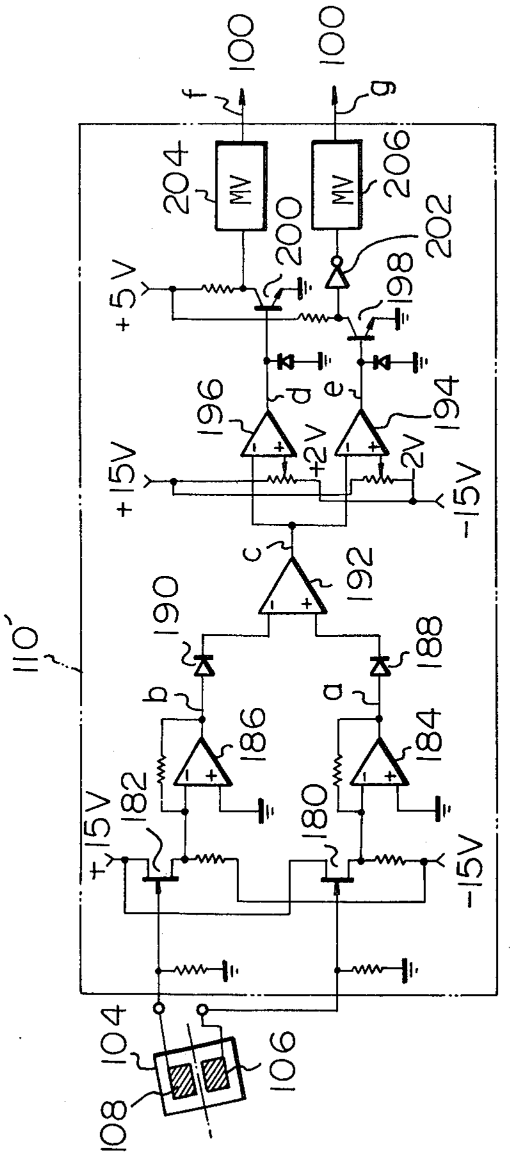
FIG. 14 is a diagram showing, a modified form of the deflection detector circuit.
Figure 15C:
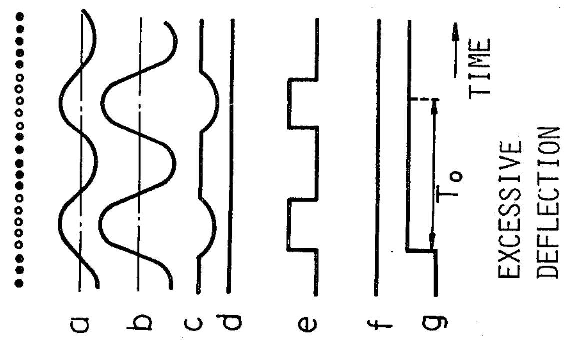
FIGS. 15*a*, 15*b* and 15*c* are timing charts showing signals which appear at various portions of the deflection detector circuit illustrated in FIG. 14.
Figure 15B:
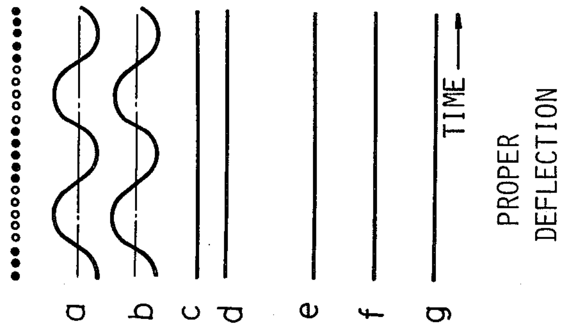
Figure 15A:
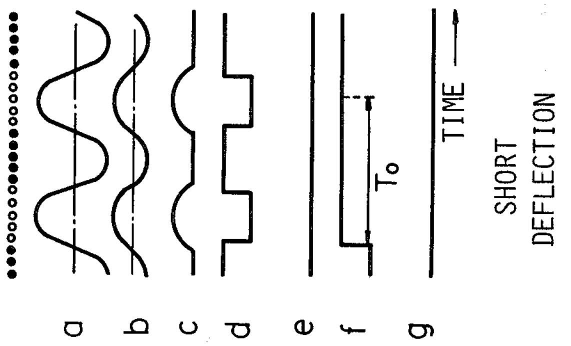

A modified form of the deflection detector circuit 110 will be described in detail with reference to FIG. 14. As in the first example, the deflection detector circuit 110' shown in FIG. 14 includes field effect transistors 180 and 182 which receive at their gates the potentials induced in the electrodes 106 and 108, respectively. The input potentials are amplified by amplifiers 184 and 186, rectified by diodes 188 and 190 and then fed to a differential amplifier 192. The output of the differential amplifier 192 is coupled to comparators 194 and 196 to be compared thereat with a predetermined positive voltage and a predetermined negative voltage, respectively. The comparator 194 produces a ground level output when the output of the differential amplifier 192 is lower than a negative reference voltage but a positive level output when otherwise; the comparator 196 producing a ground level output when the amplifier output is higher than a positive reference voltage but a positive level output when otherwise. The outputs of the comparators 194 and 196 are individually coupled to the bases of transistors 198 and 200 each of which is to become conductive in response to a positive level voltage. An inverter 202 is connected with the collector of the transistor 198 and a retriggerable monostable multivibrator 204 with the collector of the transistor 200. The inverter 202 connects to a second retriggerable monostable multivibrator 206. Each monostable multivibrator 204 or 206 is triggered upon a rise of the input from the ground level to a positive level so as to produce a "1" level output (positive level) for a predetermined period of time $T_o$ and, if triggered before the period of time $T_o$ expires, it produces a "1" level output for another period of time $T_o$. If non-triggered for a period of time $T_o$, the monostable multivibrator restores the ground level upon the lapse of the time period $T_o$. The outputs of the monostable multivibrators 204 and 206 are supplied to the microcomputer 100. The microcomputer 100 supplies the print charging signal generator 38 with a charging signal (print data) which charges a string of five ink droplets but not a string of the next five ink droplets. The charged ink droplets and noncharged ink droplets are indicated by black dots and white dots in FIGS. 15*a*–15*c*, respectively. Therefore, while the actual path of charged ink droplets is offset toward the electrode 106, the output f of the circuit 110' becomes "1" level as shown in FIG. 15*a* to indicate a short deflection. As long as the actual path is midway between the electrodes 106 and 108, both the outputs f and g of the circuit 110' are "0" level indicating a proper deflection, as shown in FIG. 15*b*. In the case of an excessive deflection, the output g of the circuit 110' will become "1" level. For a deflection control, the microcomputer 100 varies the charging voltage with reference to the outputs f and g of the circuit 110'. It will be noted that, instead of the non-contact type detection method described hereinabove, a contact type detection method may be employed in which at least one electrode is positioned in a reference deflection position so as to detect a charge resulting from impingement of a deflected ink droplet thereon.

Figure 16:
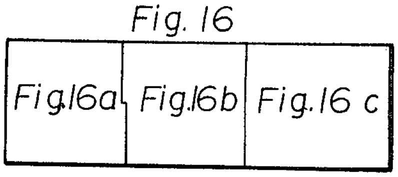
FIG. 16, consisting of component
Figure 16A:
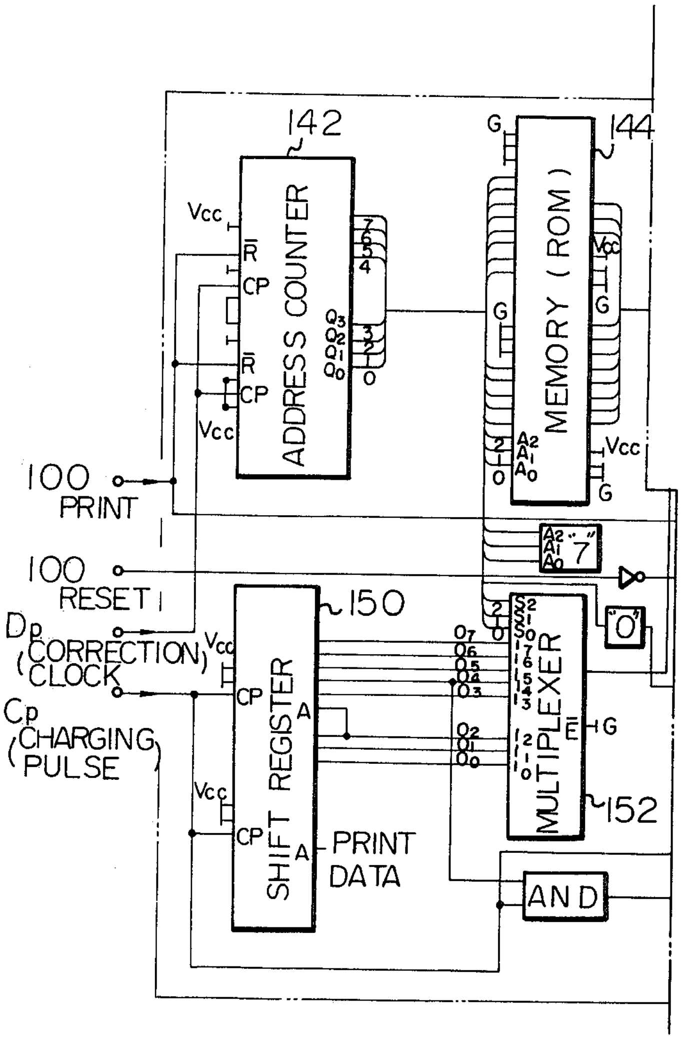
FIGS. 16*a* to 16*c*, is a block diagram of a modified form of the print charging voltage generator which is connected with the print charging signal generator and pump driver.
Figure 16B:
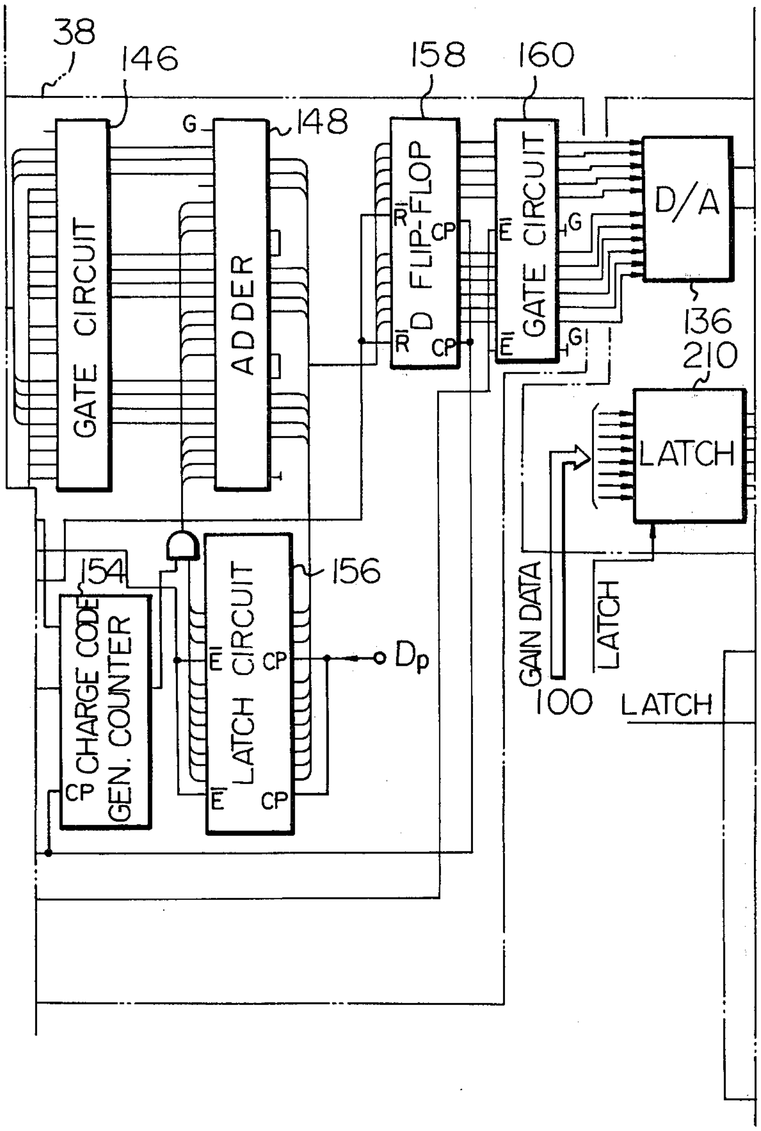
Figure 16C:
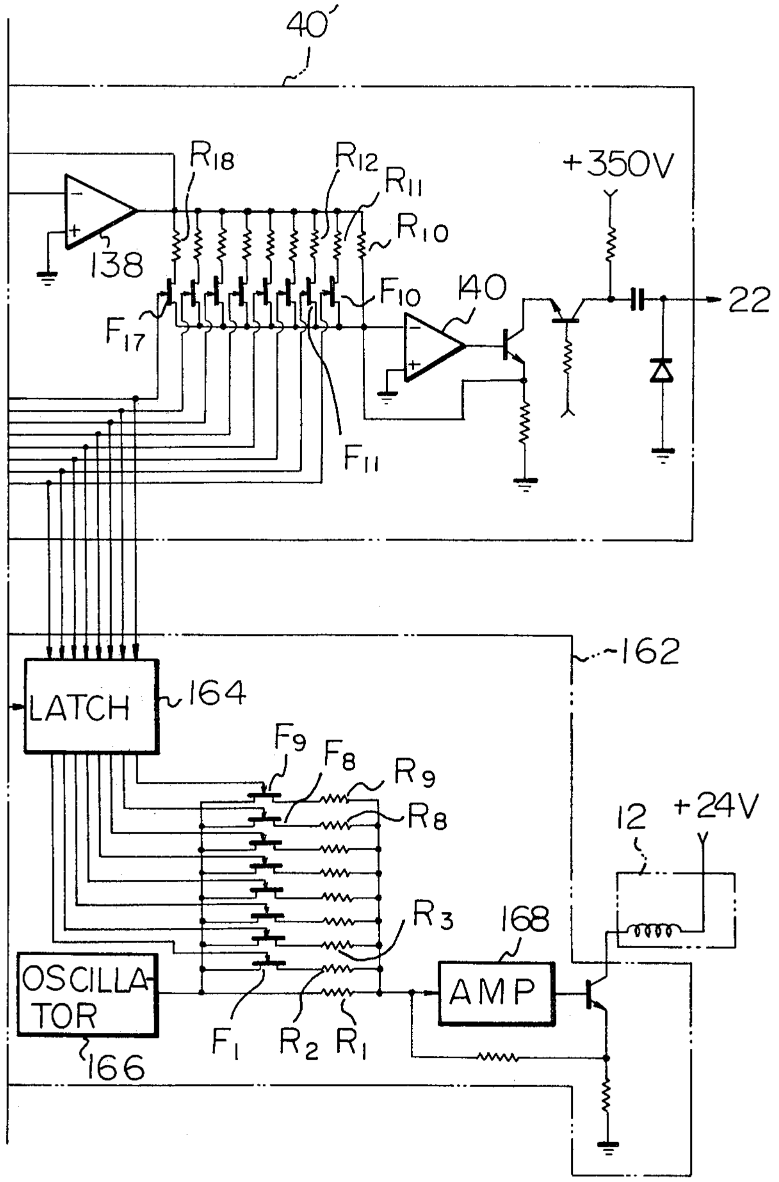

Referring to FIG. 16, a modified print charging voltage generator 40' is illustrated in connection with the print charging signal generator 38 and pump driver 162.

In the print charging voltage generator 40', the gain of the amplifier 140 is determined by the resistances of resistors $R_{10}$–$R_{18}$ and selective on-off control of field effect transistors $F_{10}$–$F_{18}$. Each of the field effect transistors $F_{10}$–$F_{18}$ is turned on or off by gain data latched in a latch circuit 210. The latch circuit 210 is loaded with a gain code by the microcomputer 100. Loading the latch circuit 164 is controlled by the microcomputer 100 through the latch circuit 210. If desired, the data supply to the latch 164 may utilize the data supply line to the latch 210.

Referring to FIGS. 17*a* and 17*b*, the operation of the microcomputer 100 will be discussed. When supplied with power, the microcomputer 100 initializes its input and output ports and performs a phase search first as previously described. In a phase search operation mode, reference pressure gain data is latched in the latch 164, the deflection voltage source circuit 96 is turned off, the switching circuit 32 is conditioned to connect the phase search charging signal generator 30 to the charging electrode 22, and the field effect transistor 56 of the charge detection circuit 36 is turned off. Monitoring the output Pok of the charge detector 36, the microcomputer 100 supplies the phase control circuit 28 with phase shift command pulses Pdk of a period of 10 μsec while the output Pok is "1" level. As soon as the output Pok turns to "0" level, the microcomputer 100 interrupts the pulses Pdk and terminates the phase search determining that the phase control circuit 28 has set up a proper phase of ink separation (Vp).

Then, the microcomputer 100 switches on the deflection voltage source circuit 96, connects the print charging voltage generator 40 to the charging electrode 22 and turns on the transistor 56 of the charge detector 36. Thereafter, the microcomputer 100 sets the print charging signal generator 38 to the 32nd step data output, counts charge timing pulses Cp and reverses the input data from recording to non-recording or vice versa every time the count reaches "6". The resultant charge pattern of ink droplets will be understood from FIGS. 15*a*–15*c*. Furthermore, the microcomputer 100 loads the latch circuit 210 with a reference voltage gain and stores an initial correction value $G=8$ in the register. The charging voltage is thus set to the 32nd step reference voltage. The ink is under the reference pressure which is determined by the reference pressure gain data in the latch 164. Reading the outputs g and f of the deflection detector circuit 110' (FIG. 14), the microcomputer replaces the data latched in the latch 210 with (reference voltage gain − initial correction value G=8) if the output g is "1" level indicative of an excessive deflection, replaces the latched data with (reference voltage gain + initial correction value G=8) and loads the G memory of the register with G=½G=4 if the output f is "1" level indicative of a short deflection, and terminates the deflection control if both the outputs f and g are "0" level. When the output g or f is "1" level, the microcomputer 100 checks the output f or g after the renewal of the latched data and, if g is "1" level, subtracts G=½G=4 from the reference gain code this time while, if f is "1" level, adding G=½G=4 to the reference gain code to renew the latched data. Then, the microcomputer 100 stores G=½G=2 in the register and checks the outputs f and g. In this way, the microcomputer 100 progressively reduces the correction value G until both the outputs f and g become "0" level. After G=1, the microcomputer 100 makes G=0 and alters the data in the latch 210. In short, the gain is varied by geometrical progression so that the actual path of ink droplets is brought to the midway between the electrodes 106 and 108. If the output g or f remains "1" level even after the detection of a deflection with G=0, the reference gain is incremented or decremented step by step. When g=f="0" level is reached, ink droplets fly through the path midway between the electrodes 106 and 108 and the microcomputer 100 determines that the deflection is proper.

Next, the microcomputer 100 calculates a difference (deviation) between the gain code latched in the latch 210 (stored in RAM of the microcomputer 100) and the reference gain code, reads an ink pressure adjustment gain (±) corresponding to the difference from ROM, adds the gain to the data in the latch 164 (stored in RAM of the microcomputer 100), latches the sum in the latch 164, carries out another phase search after the lapse of a given delay time, and then performs another charging voltage detection for a proper deflection. This is repeated until f=g="0" level is reached with the reference gain code held in the latch 210. Accordingly, during the repeated procedure, ink pressure is progressively varied in inverse proportion to ink temperature. As f=g="0" level is set up while the reference gain code is latched in the latch 210, a predetermined deflection is reached with the charging voltage controlled to an appropriate level leaving a sufficient allowance for an adjustment of the charging voltage. Again, this promotes high quality data reproduction for the reasons previously discussed with reference to FIG. 11.

As will be recalled, the electrodes 106 and 108 for non-contact detection may be replaced by at least one electrode for contact detection such as disclosed in Japanese Patent Application nos. 53-165187/1978, 55-24303/1980 and 55-28780/1980, for example.

Figures 18, 18A:
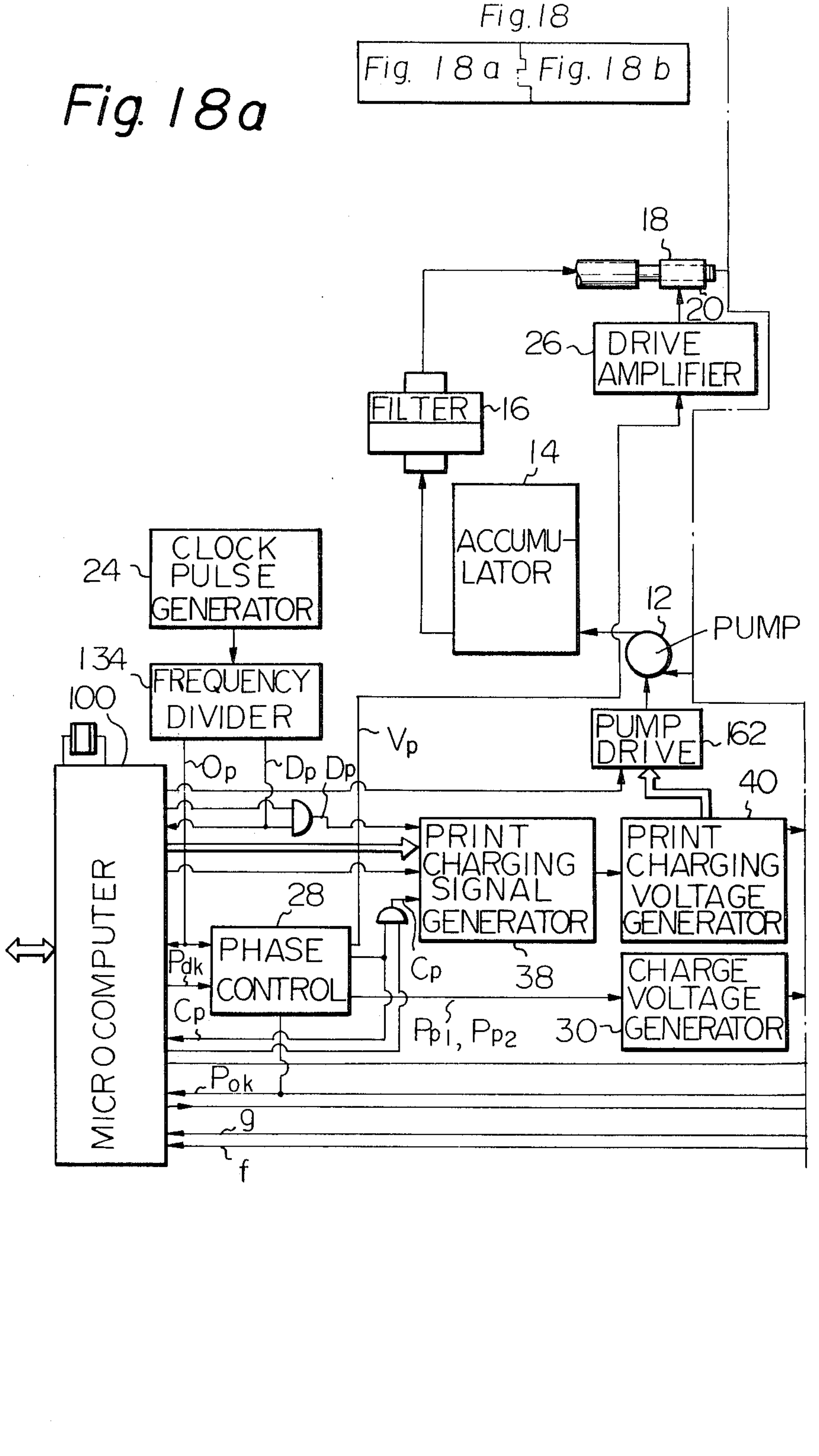
FIG. 18, consisting of component
FIGS. 18*a* and 18*b*, is a block diagram showing another embodiment of the deflection control type ink jet printer of the present invention.
Figure 18B:
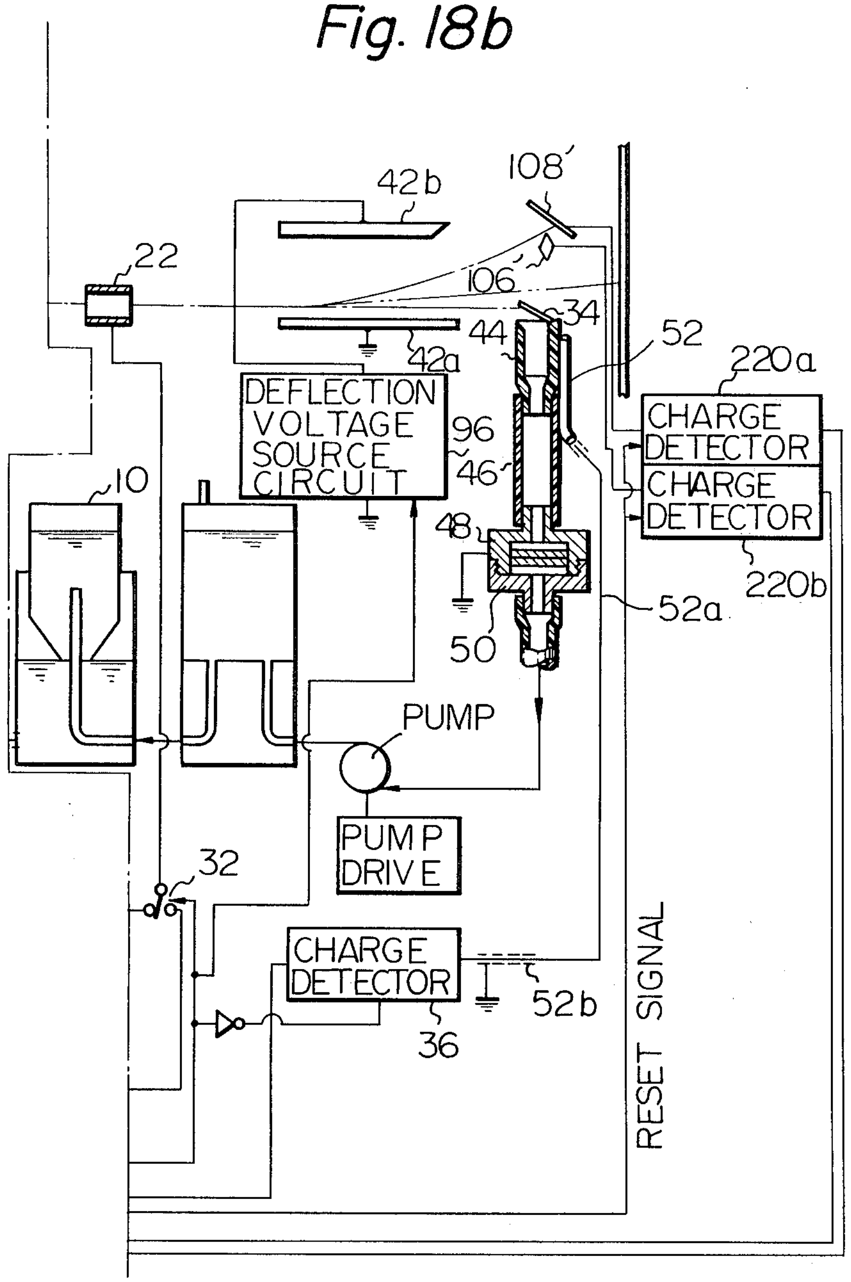
Figure 19:
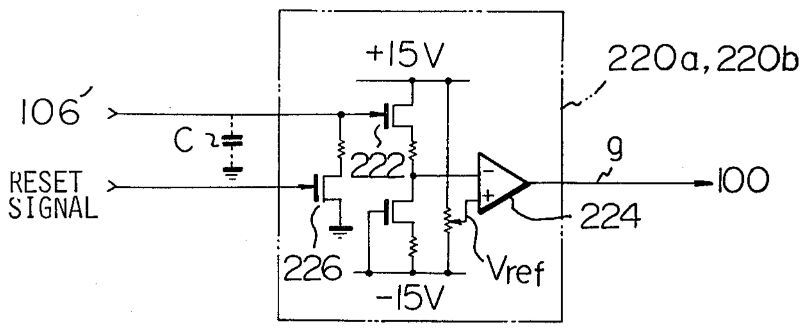
FIG. 19 is a diagram showing a charge detector circuit of FIG. 18.
Figure 20:
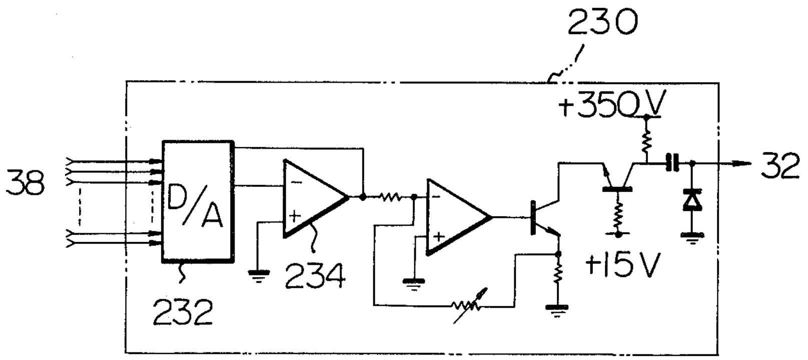
FIG. 20 is a diagram showing a charging voltage generator of FIG. 18.

Referring to FIG. 18, there is shown another embodiment of the present invention which uses two electrodes on which ink droplets are to impinge. As shown, a first electrode 106′ is connected with a first charge detection circuit 220*a* while a second electrode 108′ is connected with a second charge detection circuit 220*b*. As shown in detail in FIG. 19, the charge detector 220*a* is constructed to detect a charge on an ink droplet by amplifying a voltage charged in a floating capacity C due to the charge on the ink droplet and then comparing it with a reference level Vref. Before the charge detection, a field effect transistor 226 is temporarily turned on to cause the floating capacity C to be discharged. The charge detector 220*b* is exactly the same in construction as the charge detector 220*a*. A charging voltage generator 230 applicable to this embodiment is shown in FIG. 20. The output of the print charging signal generator 38, which is a charging voltage code in this case, is transformed by a digital-to-analog or D/A converter 232 into an analog voltage which is then coupled to an amplifier 234.

Figure 21:
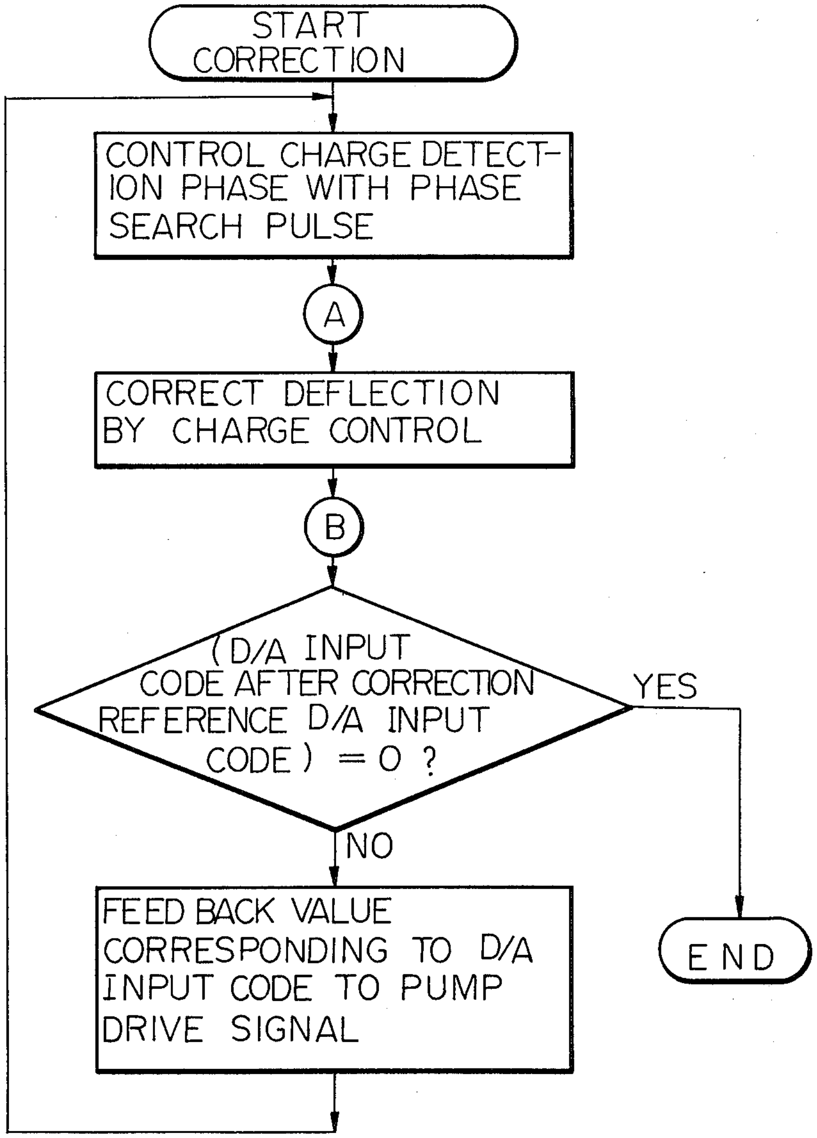
FIGS. 21, 22 and 23 are flowcharts demonstrating a deflection control operation of a microcomputer of FIG. 18.
Figure 22:
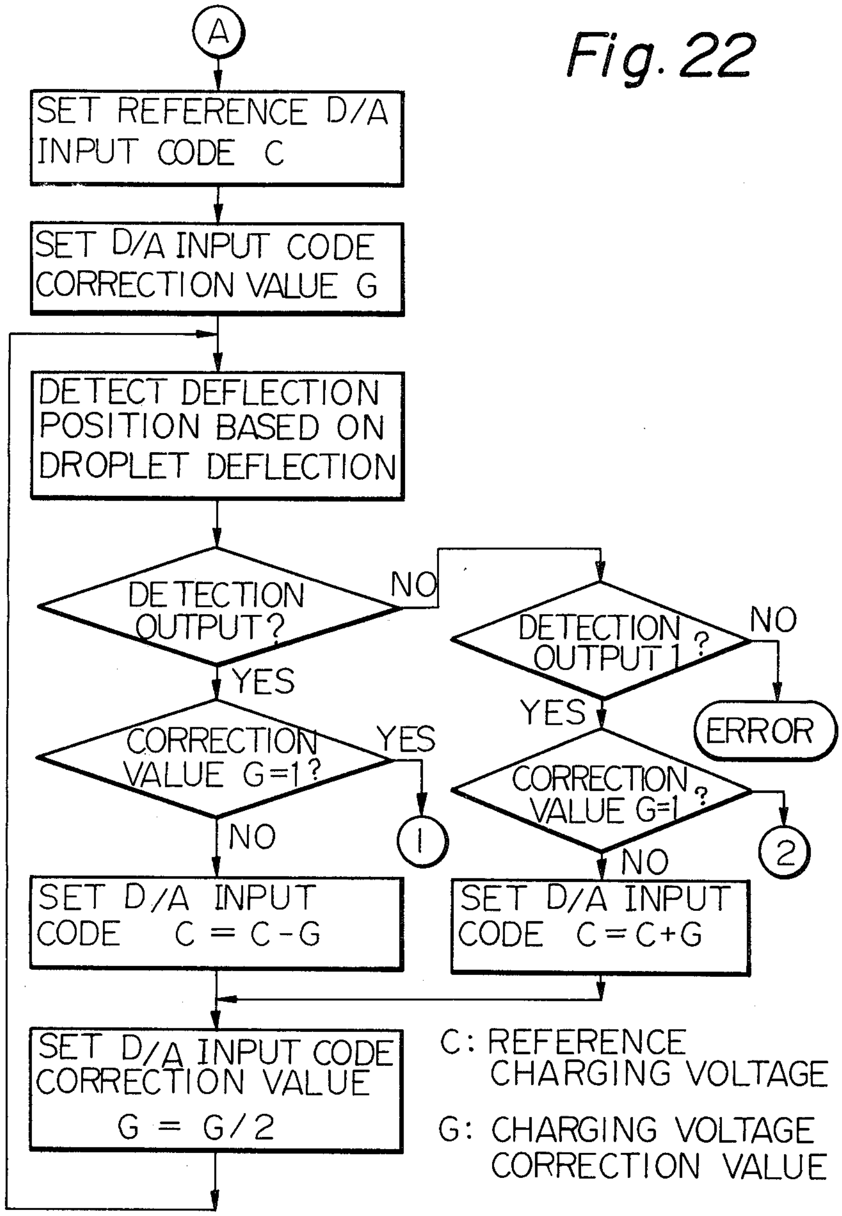
Figure 23:
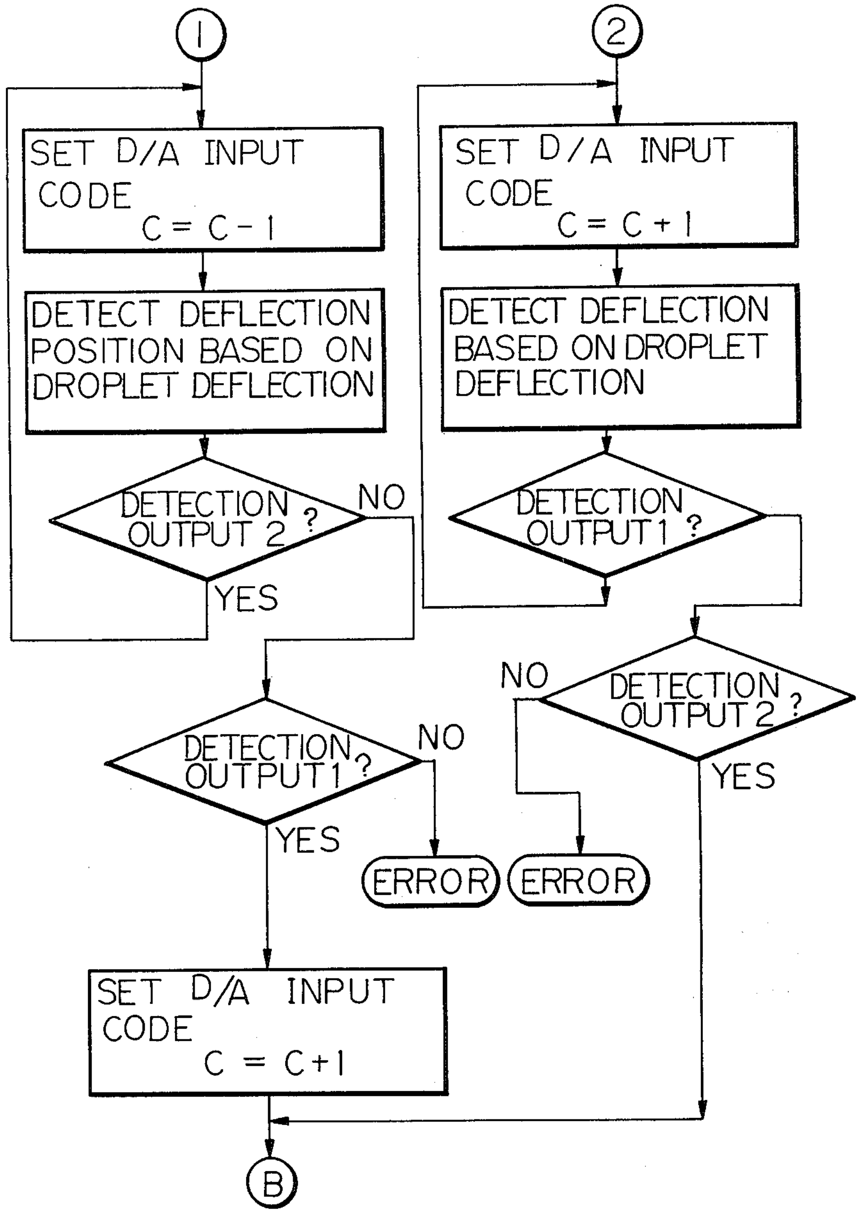

Referring to FIGS. 21, 22 and 23, the operation of the microcomputer 100 in such an alternative embodiment will be discussed. After the same procedure for a phase search as in the preceding embodiment, the microcomputer 100 sets the charging voltage to a reference charging voltage (c code), switches on the deflection voltage source circuit 96, once resets the charge detection circuits 220*a* and 220*b*, and checks the outputs g and f of the circuits 220*a* and 220*b* upon the lapse of a predetermined period of time $t_d$. If the output g is at a logical level which indicates "charged", the microcomputer 100 supplies the print charging signal generator 38 with a code indicative of the sum of an initial correction value $V_A$ and the reference charging voltage, resets the circuits 220*a* and 220*b*, and again checks the outputs g and f upon the lapse of another period of time $t_d$. If the output g is still at the "charged" level, the microcomputer supplies the generator 38 with a charge voltage code indicative of the sum of a correction value $V_A/2$ and (reference charging voltage + $V_A$); if the output f is at a level indicating "charged", the microcomputer 100 feeds to the generator 38 a charging voltage code indicative of a value given by subtracting $V_A/2$ from (reference charging voltage + $V_A$). Thereafter, the same procedure is repeated progressively reducing the deflection by one half ($V_A$, $V_A/2$ ...) each time until the circuit 220*b* detects a charged droplet instead of the circuit 220*a* while the detection is short of a predetermined value. This is the end of the deflection detection. Then, a pressure varying value corresponding to the latest cumulative correction value G (actual charging voltage at the end of the deflection detection—reference charging voltage) is added to or subtracted from the pump driver 162 as an amount of variation. Thereafter, the microcomputer 100 returns to a phase search to perform the abovementioned detection of deflection and variation of ink pressure. As the correction value G reaches decreases beyond the predetermined value, the microcomputer 100 terminates the adjustment of deflection (ink pressure) and starts on a printing operation.

Various modifications will become possible for those skilled in the art after receiving the teachings of the present disclosure without departing from the scope thereof.

What is claimed is:

1. A deflection control type ink jet printing apparatus comprising:

an ink ejection head for ejecting a jet of ink;

charging means for electrostatically and selectively charging ink droplets separated from the jet of ink;

deflection means for electrostatically deflecting the charged ink droplets to a plurality of predetermined steps in accordance with the electrostatic charges on the ink droplets;

deflection detecting means for detecting a deviation from a reference deflection of a deflection of the charged ink droplets which are deflected to predetermined one of the plurality of steps;

ink supply means for supplying an ink under a predetermined variable pressure to the head; and control means for controlling the ink supply means to vary the pressure to be applied to the ink in accordance with a deviation detected by said deflection detecting means;

the deflection detecting means comprising electrode means for sensing an amount of charge on each deflected ink droplet, and computing means for computing the deviation in response to the sensed amount of the charge on the deflected ink droplet;

the electrode means comprising first and second electrodes disposed parallel to each other and downstream of the deflection means, an ink deflection path through which the ink droplets of the reference deflection are to pass being defined intermediate between the first and second electrodes, the electrodes being constructed to sense voltages induced by the deflected ink droplets passing through said ink deflection path.

2. An apparatus as claimed in claim 1, in which the computing means comprises comparator means for comparing the induced voltage sensed by the first electrode with the induced voltage sensed by the second electrode to compute a difference therebetween to thereby detect the deviation of the deflected ink droplets.

3. An apparatus as claimed in claim 1, in which the control means comprises a microcomputer.

4. A deflection control type ink jet printing apparatus comprising:

an ink ejection head for ejecting a jet of ink;

charging means for electrostatically and selectively charging ink droplets separated from the jet of ink;

deflection means for electrostatically deflecting the charged ink droplets to a plurality of predetermined steps in accordance with the electrostatic charges on the ink droplets;

deflection detecting means for detecting a deviation from a reference deflection of a deflection of the charged ink droplets which are deflected to predetermined one of the plurality of steps;

ink supply means for supplying an ink under a predetermined variable pressure to the head; and control means for controlling the ink supply means to vary the pressure to be applied to the ink in accordance with a deviation detected by said deflection detecting means;

the ink supply means comprising a pump for applying the variable pressure to the ink and supplying the pressurized ink to the head and a pump driver for controlling the pump to vary the pressure to be applied to the ink in accordance with the detected deviation.

5. An apparatus as claimed in claim 4, in which the pump driver is constructed to vary the current level for driving the pump.

6. An apparatus as claimed in claim 4, in which the pump drive is constructed to vary the current frequency for driving the pump.

7. An apparatus as claimed in claim 4, in which the deflection detecting means comprises first and second electrodes disposed downstream of the deflection means and being spaced from each other in a direction of deflection deviation of the ink droplets.

8. An apparatus as claimed in claim 7, in which an ink, deflection path through which the ink droplets of the reference deflection are to pass is defined intermediate between the first and second electrodes, the first and second electrodes being arranged for non-contact detection of the ink droplets.

9. An apparatus as claimed in claim 7, in which the first electrode is arranged for contact detection of the ink droplets whereas the second electrode is arranged for non-contact detection of the ink droplets.

* * * * *